(12) United States Patent
Fujii

(10) Patent No.: US 7,522,987 B2
(45) Date of Patent: Apr. 21, 2009

(54) FUEL INJECTION CONTROL SYSTEM

(75) Inventor: Hiroto Fujii, Kariya (JP)

(73) Assignee: Denso Corporation, Kariya (JP)

( * ) Notice: Subject to any disclaimer, the term of this patent is extended or adjusted under 35 U.S.C. 154(b) by 97 days.

(21) Appl. No.: 11/826,686

(22) Filed: Jul. 17, 2007

(65) Prior Publication Data
US 2008/0017173 A1 Jan. 24, 2008

(30) Foreign Application Priority Data
Jul. 21, 2006 (JP) ............................. 2006-199452

(51) Int. Cl.
*G06F 19/00* (2006.01)
*F02M 51/00* (2006.01)
(52) U.S. Cl. ..................... 701/104; 701/115; 123/486
(58) Field of Classification Search ................. 123/478, 123/480, 486, 490, 492, 493; 701/101–105, 701/112–115
See application file for complete search history.

(56) References Cited

U.S. PATENT DOCUMENTS

| | | | | | |
|---|---|---|---|---|---|
| 4,492,203 A | * | 1/1985 | Yutaka | ........................ | 123/478 |
| 4,580,541 A | * | 4/1986 | Koumura | ..................... | 123/478 |
| 4,697,568 A | * | 10/1987 | Yasuoka | ...................... | 123/490 |
| 5,307,276 A | * | 4/1994 | Takahashi et al. | ........... | 701/106 |
| 6,755,176 B2 | | 6/2004 | Takeuchi et al. | | |
| 2008/0072879 A1 | * | 3/2008 | Nagase et al. | ............... | 123/494 |

FOREIGN PATENT DOCUMENTS

| | | | | | |
|---|---|---|---|---|---|
| EP | 1775454 A2 | * | 4/2007 | ................. | 701/104 |
| JP | 2003-254139 | | 9/2003 | | |

* cited by examiner

*Primary Examiner*—Willis R Wolfe, Jr.
(74) *Attorney, Agent, or Firm*—Nixon & Vanderhye, PC

(57) ABSTRACT

An apparatus aims at learning a deviation from a reference injection characteristic of a fuel injector provided for a cylinder of an engine having an output shaft. In the apparatus, a detecting unit is configured to detect a minimum interval between temporally adjacent fuel injection periods in the plurality of fuel injection periods based on a behavior of the output shaft during execution of the plurality of fuel injections. The minimum interval maintains the temporally adjacent fuel injection periods to be non-overlapped with each other. A learning unit is configured to learn the deviation from the reference injection characteristic of the fuel injector based on the detected minimum interval.

9 Claims, 13 Drawing Sheets

(a) INJECTION PERIOD (b) LIFT AMOUNT OF NEEDLE VALVE

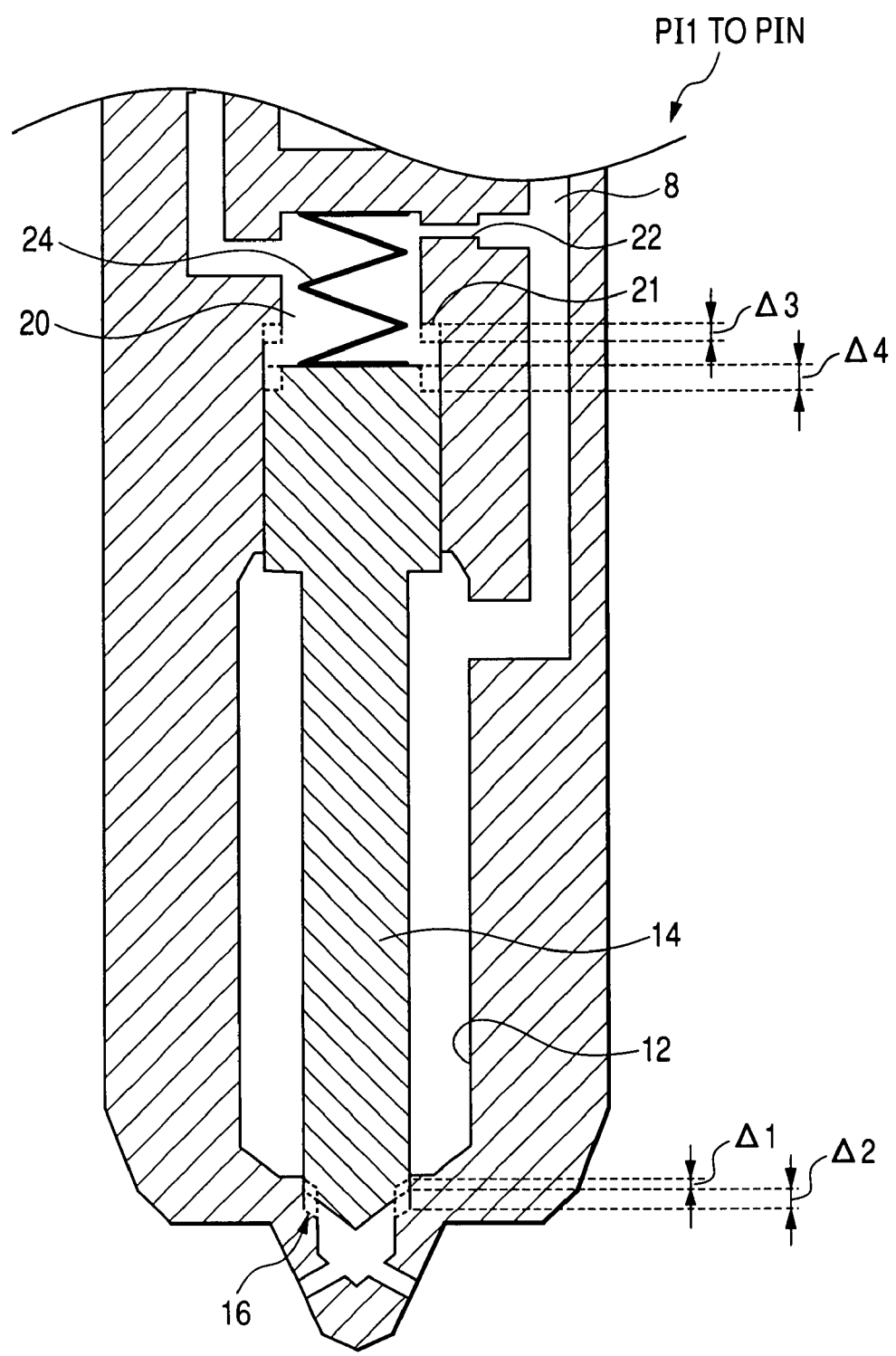

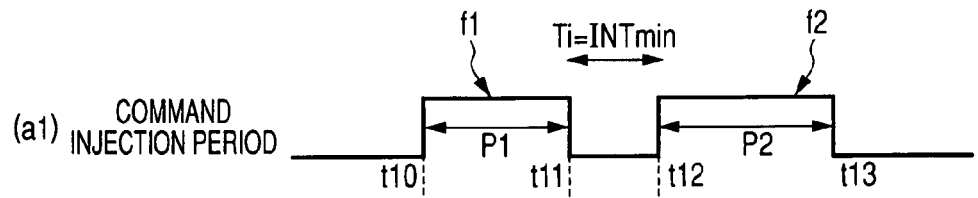
FIG. 6A
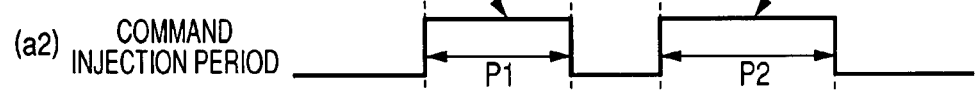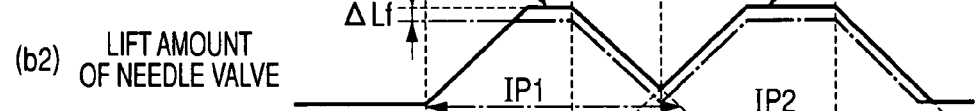
FIG. 6B
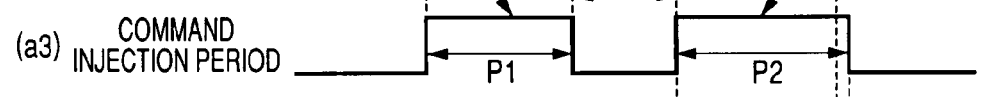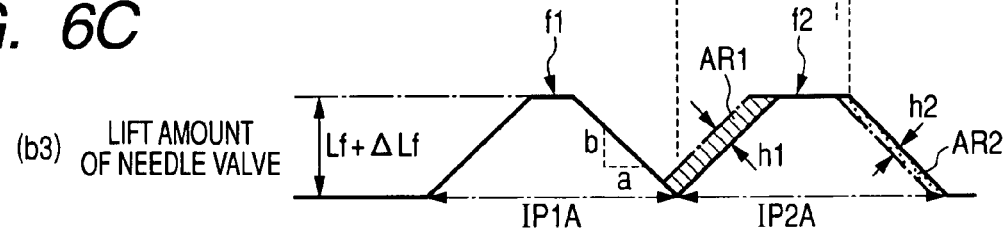
FIG. 6C
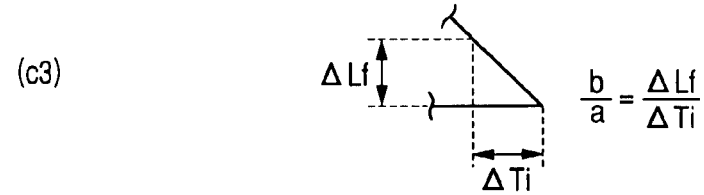

CORRECTED COMMAND
INJECTION PERIOD

FIG. 12A (STEP S8 TO STEP S14)

| CONTROL ON AND OFF OPERATIONS OF CHARGING AND DISCHARGING SWITCHES TO CARRY OUT FUEL INJECTIONS EVERY Ti TO CALCULATE $\Delta NEi(n)$ OF ROTATION SPEED | — S16a |

↓

(STEP S18 TO S24)

↓

| CORRECT INCREASE IN TOTAL LENGTH OF PIEZO ELEMENT DURING ENGINE OPERATING CONDITION BEING CONTAINED IN FULL LIFT INJECTION REGION | — S26a |

↓

STEP S28

| FUEL PRESSURE | | | | ... |
|---|---|---|---|---|
| AMOUNT OF ENERGY SUPPLIED TO PIEZO ELEMENT | | | | ... |

FUEL INJECTION CONTROL SYSTEM

CROSS REFERENCE TO RELATED APPLICATION

This application is based on Japanese Patent Application 2006-199452 filed on Jul. 21, 2006. This application aims at the benefit of priority from the Japanese Patent Application, so that the descriptions of which are all incorporated herein by reference.

BACKGROUND OF THE INVENTION

1. Field of the Invention

The present invention relates to fuel injection control systems used for internal combustion engines; these systems are capable of learning at least one parameter indicative of a change in the injection characteristics of a fuel injector.

2. Description of the Related Art

Fuel injection control systems are commonly used to control fuel injection by an injector for each cylinder of an engine.

When a needle valve is rested (seated) upon an inner wall (valve seat) of a fuel injector, the fuel injector is closed. When the needle valve is moved from the valve seat so that a physical distance between the needle valve and the valve seat increases, the fuel injector is opened. This allows a proper amount of pressurized fuel to be metered from a nozzle of the fuel injector.

In fuel injection control using such a fuel injector, fuel-quantity parameters are adjusted depending on a command value indicative of a predetermined amount of fuel so that an actual quantity of pressurized fuel to be squirted out from the fuel injector is controlled. As such fuel-quantity parameters, an optimum fuel injection timing and/or an optimum fuel injection period (valve opening period) can be used.

Even if the fuel-quantity parameters for a plurality of fuel injectors of an internal combustion engine are determined to be equalized to each other, however, individual injection characteristics of the fuel injectors different therebetween may cause variations in actually sprayed fuel quantities therefrom.

In order to address variations in actually sprayed fuel quantities from fuel injectors of an internal combustion engine, a control system is disclosed in U.S. Patent Publication No. 6755176 corresponding to Japanese Unexamined Patent Publication No. 2003-254139.

The control system disclosed in the U.S. Patent Publication works, while performing n split fuel injections by each fuel injector (each cylinder) under idling speed control, to:

measure a value of variations in the engine speed for each cylinder;

compare the measured value for each of the individual cylinders with an average value of all of the measured values for the individual cylinders;

calculate a first fuel quantity correction value for each fuel injector (each cylinder) required to smooth the variations between the respective cylinders based on the comparison result to thereby individually correct an fuel quantity of each fuel injector based on a corresponding one of the firs fuel quantity correction values;

compare an average engine speed with a target engine speed;

calculate a second fuel quantity correction value for all of the fuel injectors required to keep the average engine speed up with the target engine speed based on the comparison result to thereby commonly correct an fuel quantity of each fuel injector based on the second fuel quantity correction value; and update a previously stored learned value for each fuel injector to a learned value currently obtained by:

dividing the first fuel quantity correction value for each fuel injector by n to obtain a first n-divided correction value therefor;

dividing the second fuel quantity correction value by n to obtain a second n-divided correction value; and adding, to the previously stored learned value for each fuel injector, the sum of the first n-divided correction value for a corresponding one of the fuel injectors and the second n-divided correction value.

Specifically, the learned values to be updated for the respective fuel injectors allow the variations in the fuel injection characteristics of each of the fuel injectors to be compensated.

Note that the variations in the fuel injection characteristics of each of the fuel injectors during execution of the pilot fuel injections probably arise depending on variations in the flow passages of pressurized fuel in a corresponding one of the fuel injectors.

Factors responsible for the occurrence of variations in the fuel injection characteristics of each of the fuel injectors however are not limited to the fuel flow-passage variations.

That is, the inventors have found that the factors include variations in the full lift strokes of the needle valves of the individual fuel injectors.

More specifically, the full lift stroke of the needle valve in a fuel injector varies depending on the wearing out of:

the needle valve and the valve seat due to the seating of the needle valve onto the valve seat; and/or the needle valve and a lift stopper by which the lifting of the needle valve is limited at the full lift stroke.

The more the full lift stroke in a fuel injector increases, the more the fuel quantity to be sprayed therefrom.

The variations in the full lift strokes of the needle valves of a fuel injector have an influence on those in the fuel injection characteristics thereof only when the needle valve is required to move up to its full lift position under high speed and high-load conditions of the internal combustion engine.

In contrast, as described above, the control system disclosed in the U.S. Patent Publication is configured to obtain learned values for each of the fuel injectors for compensating the variations in its fuel injection characteristics only under idling speed control of the internal combustion engine.

This may make it difficult to obtain a learned value for each of the fuel injectors for compensating the variations in its fuel injection characteristics under high speed and high-load conditions of the internal combustion engine.

For this reason, the variations in the fuel injection characteristics of each of the fuel injectors under high speed and high-load conditions of the internal combustion engine may have much influence on the output characteristics of the internal combustion engine. Specifically, the variations in the fuel injection characteristics of each of the fuel injectors under high speed and high-load conditions of the internal combustion engine may cause deterioration of the exhaust characteristic of the internal combustion engine and/or the drivability of a vehicle in which the internal combustion engine is installed.

Thus, it is important to learn, under high speed and high-load conditions of the internal combustion engine, the amount of deviation from the fuel injection characteristics of each of the fuel injectors in order to keep the output characteristics of the internal combustion engine in good conditions.

SUMMARY OF THE INVENTION

In view of the background, an object of at least one aspect of the present invention is to provide fuel injection control systems, which are capable of properly learning the amount of deviation from a reference injection characteristic of a fuel injector; the reference injection characteristic being designed when a full movement stroke of a valve is kept unchanged.

According to one aspect of the present invention, there is provided an apparatus for learning a deviation from a reference injection characteristic of a fuel injector provided for a cylinder of an engine having an output shaft. Power is generated in the cylinder based on fuel injected from the fuel injector thereinto and is transferred to the output shaft via a mechanism so as to rotate the output shaft. The apparatus includes an injection executing unit configured to cause the fuel injector to execute a plurality of fuel injections into the cylinder for a plurality of injection periods, respectively. The apparatus includes a detecting unit configured to detect a minimum interval between temporally adjacent fuel injection periods in the plurality of fuel injection periods based on a behavior of the output shaft during execution of the plurality of fuel injections. The minimum interval maintains the temporally adjacent fuel injection periods to be non-overlapped with each other. The apparatus includes a learning unit configured to learn the deviation from the reference injection characteristic of the fuel injector based on the detected minimum interval.

According to another one aspect of the present invention, there is provided an apparatus for learning a deviation from a reference injection characteristic of a fuel injector and provided for a cylinder of an internal combustion engine having an output shaft. The fuel injector includes a valve and an actuator operatively connected thereto. The actuator is displaceable in a predetermined direction. Power is generated in the cylinder based on the fuel injected from the fuel injector thereinto and is transferred to the output shaft via a mechanism so as to rotate the output shaft. The apparatus includes an injection executing unit configured to cause the actuator to displace in the predetermined direction so that the valve moves between an original position and a predetermined full stroke in the predetermined direction to thereby execute a plurality of fuel injections into the cylinder for a plurality of injection periods, respectively. Each interval between temporally adjacent fuel injection periods in the plurality of injection periods is set to a reference minimum value. The apparatus includes a learning unit operatively connected to the actuator and configured to determine whether the temporally adjacent fuel injection periods are non-overlapped with each other while correcting an amount of the displacement of the actuator so as to move the valve at the predetermined full stroke in the predetermined direction. The learning unit is configured to learn, as the deviation from the reference injection characteristic of the fuel injector, the corrected amount of the displacement of the actuator at a time when the temporally adjacent fuel injection periods are non-overlapped with each other.

BRIEF DESCRIPTION OF THE DRAWINGS

Other objects and aspects of the invention will become apparent from the following description of embodiments with reference to the accompanying drawings in which:

FIG. 5 is a partially enlarged longitudinal cross sectional view of the piezo injector illustrated in FIG. 2;

FIG. 6A is a timing chart schematically illustrating an interval between temporally adjacent command injection periods of temporally adjacent pilot fuel injections by a piezo injector and an actual minimum interval between corresponding actual injection periods that are temporally adjacent to and not overlapped from each other;

FIG. 6B is a timing chart schematically illustrating an interval between temporally adjacent command injection periods of temporally adjacent pilot fuel injections by a piezo injector in which a full lift stroke of the needle valve increases and illustrating an actual interval between corresponding actual injection periods temporally adjacent to each other;

FIG. 6C is a timing chart schematically illustrating an increase in the interval between the adjacent command injection periods of the adjacent pilot fuel injections by the piezo injector and illustrating an actual minimum interval between actual injection periods that are not overlapped from each other;

FIG. 12A is a flowchart schematically illustrating processes to be executable by a microcomputer illustrated in FIG. 10 for executing a minimum interval detecting task and a learning task according to the second embodiment;

FIG. 12B is a view schematically illustrating a table for storing therein computed corrected amounts of energy according to the second embodiment.

DETAILED DESCRIPTION OF EMBODIMENTS OF THE INVENTION

Embodiments of the present invention will be described hereinafter with reference to the accompanying drawings.

First Embodiment

Figure 1:
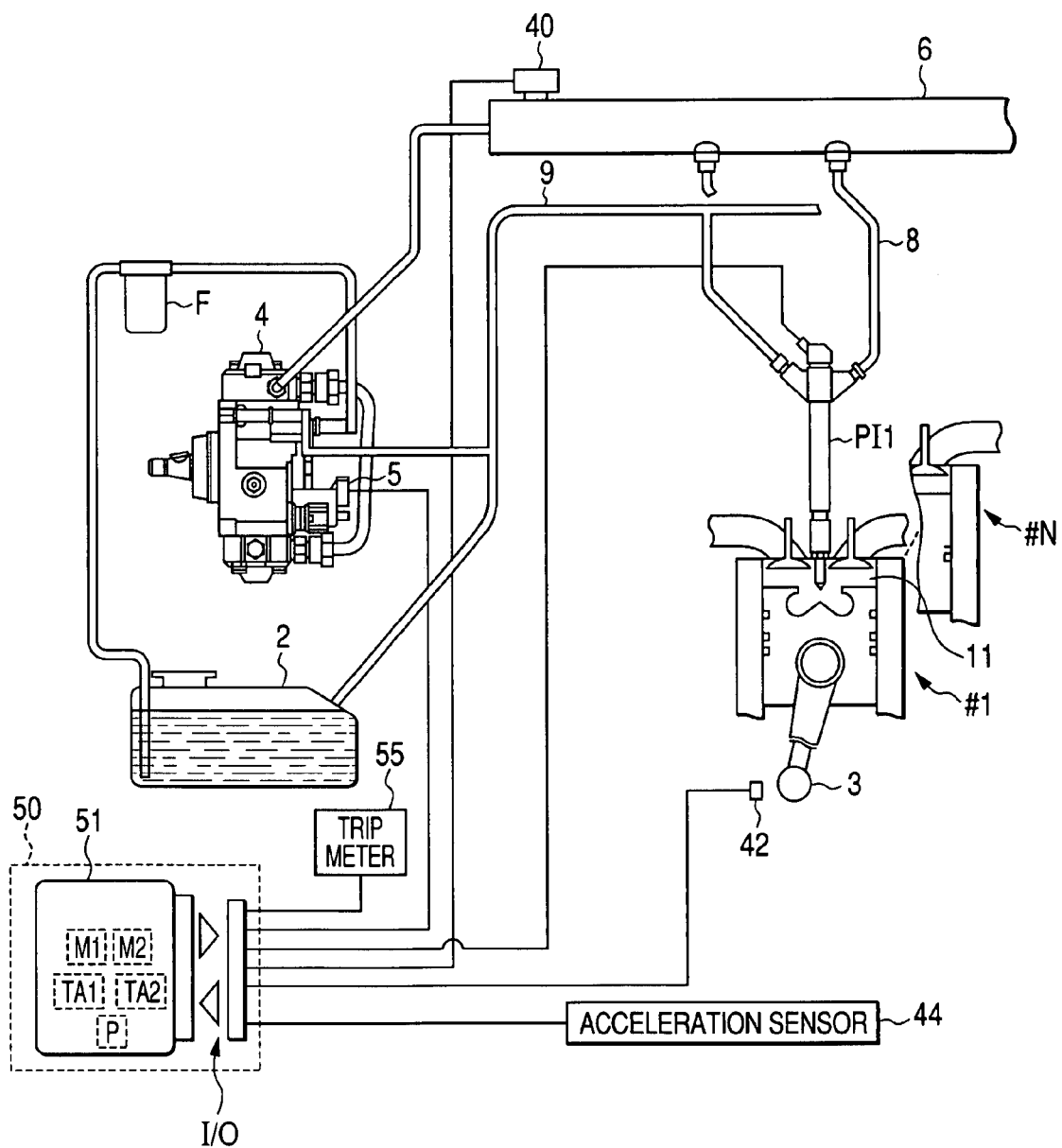
FIG. 1 is a view schematically illustrating an example of the structure of a fuel injection control system according to a first embodiment of the present invention.

Referring to FIG. 1, there is illustrated the overall structure of a fuel injection control system according to a first embodiment, which is applied for control of a direct fuel-injection engine, such as a diesel engine 1, installed in a vehicle.

The diesel engine 1 is composed of N cylinders #1 to #N as an example; this N is a positive integer greater than 1, such as 4. Identifier numbers "1" to "N" are assigned to the cylinders #1 to #N, respectively.

As illustrated in FIG. 1, the system is provided with a fuel tank 2 of the diesel engine 1 accommodating fuel, which is pumped up by a fuel pump 4 driven by rotation of a crankshaft 3 of the diesel engine 1. During the pumping-up process by the fuel pump 4, the fuel is pressurized and supplied to a common rail 6 via a filter F while it is metered by a metering valve 5 based on a control signal sent from an ECU described hereinafter.

The common rail 6 serves as an accumulator shared by the cylinders #1 to #N and operative to:

accumulate the fuel delivered from the fuel pump 4 therein with its pressure kept high; and uniformly feed the high-pressurized fuel accumulated therein to individual piezo injectors PI1 to PIN of the diesel engine 1 via high-pressure fuel passages 8.

Each of the piezo injectors PI1 to PIN is installed at its one distal end in a combustion chamber 11 of a corresponding one of the cylinders #1 to #N, allowing the pressurized fuel to be directly sprayed out in the combustion chamber 11.

The piezo injectors PI1 to PIN are communicated with the fuel tank 2 and the fuel pump 4 via low-pressure fuel passages 9. Each of the low-pressure fuel passages 9 allows fuel to be returned from a corresponding one of the piezo injectors PI1 to PIN into the fuel tank 2 for collection and/or into the fuel pump 4 for lubrication.

Figure 2:
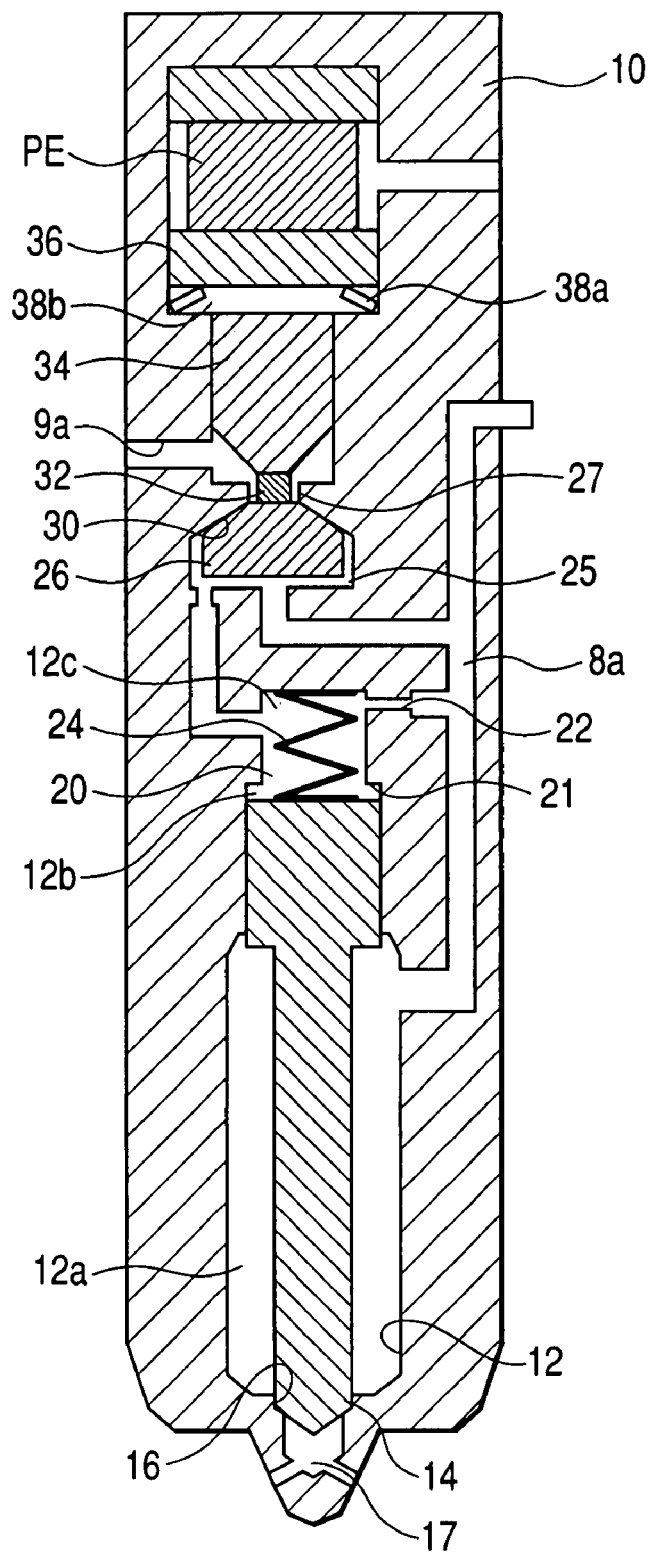
FIG. 2 is a longitudinal cross sectional view of a piezo injector illustrated in FIG. 1.

FIG. 2 schematically illustrates an example of the structure of the piezo injector PI1. Note that the other piezo injectors PI2 to PIN have the same structure of the piezo injector PI1.

The piezo injector PI1 consists of a substantially cylindrical body (housing) 10. The body 10 is formed at its one distal end with a nozzle 17 at the center thereof.

The body 10 is also formed at the interior of its one end portion with a cylindrical needle containing chamber (cavity) 12 arranged in the length direction.

The needle containing chamber 12 consists of a first chamber portion 12a, a second chamber portion 12b, and a third chamber portion 12c.

The first chamber portion 12a is arranged to communicate with the nozzle 17 of the one distal end of the body 10. The one distal end of the body 10 constitutes one end wall of the needle containing chamber 12.

The second chamber portion 12b is communicated with the first chamber portion 12a, and has a diameter smaller than that of the first chamber portion 12a.

The third chamber portion 12c has an end wall constituting the other end wall of the needle containing chamber 12, and has a diameter smaller than that of the second chamber portion 12b. Specifically, the second cylindrical portion 12b has one annular wall portion 21 surrounding the third chamber portion 12c.

As described above, the one distal end of the piezo injector PI1 is disposed to be installed in the combustion chamber 11 of the cylinder #1 so that the combustion chamber 11 and chamber 12 are communicable with each other via the nozzle 17. An annular inner surface of the one end wall of the chamber 12 surrounding the nozzle 17 constitutes a needle seat 16.

The piezo injector PI1 is provided with a needle valve 14 having one part and the remaining part that is larger in diameter than the one part and that is substantially equal in diameter to the second chamber portion 12b. The needle valve 14 is smaller in length than the needle containing chamber 12.

The needle valve 14 is arranged to be contained in the first chamber portion 12a and part of the second chamber portion 12b of the chamber 12 such that:

its one end is opposite to the nozzle 17; and the other end (back-side end) is opposite to the other end wall of the chamber 12 via the third chamber portion 12c and the remaining part of the second chamber portion 12b.

The cylindrical space formed by the third chamber portion 12c and the remaining part of the second chamber portion 12b constitutes a back pressure chamber 20.

The needle valve 14 is also arranged to be movable along an axial direction thereof in the chamber 12.

When one end of the needle valve 14 is seated upon the needle seat 16, the piezo injector PI1 is closed so that the needle containing chamber 12 is isolated from the combustion chamber 11.

In contrast, when the needle valve 14 is moved from the needle seat 16 so that a physical distance between the one end of the needle valve 14 and the needle seat 16 increases, the piezo injector PI1 is opened. This allows the needle containing chamber 12 to be communicated with the combustion chamber 11.

As described above, the third chamber portion 12c is smaller in diameter than the second chamber portion 12b and the other end of the needle valve 14 is substantially equal in diameter to the second chamber portion 12b.

For this reason, the needle valve 14 is limited to move up to the annular wall portion 21 of the second chamber portion 12b. Specifically, the annular wall portion 21 serves as a needle stopper 21. A distance between the needle seat 16 and the annular wall portion (needle stopper) 21 represents a full lift stroke of the needle valve 14. Specifically, when the needle valve 14 is moved to abut the needle stopper 21, the needle valve 14 is located at the full lift thereof, and the back pressure chamber 20 is formed by the other end of the needle valve 14 and the third chamber portion 12c.

The needle containing chamber 12 of the body 10 is designed such that the full lift stroke of the needle valve 14 is set to a desired length.

The body 10 is formed at its inside with a high-pressure fuel passage 8a communicable with the corresponding high-pressure fuel passage 8 and with the first chamber portion 12a of the needle accommodating chamber 12. This allows the high-pressurized fuel to be supplied from the common rail 6 into the first chamber portion 12a of the needle accommodating chamber 12 via the high-pressure fuel passages 8 and 8a.

The back pressure chamber 20 is communicated with the high-pressure fuel passage 8a via an orifice 22.

The piezo injector PI1 is provided with a needle spring 24. The needle spring 24 is inserted in the back pressure chamber 20 between the other end of the needle valve 14 and the other end wall of the chamber 12. The needle spring 24 works to urge the needle valve 14 toward the needle seat 16.

The body 10 is formed at the other end portion with a cylindrical displacement transfer chamber 38 consisting of first and second chamber portions 38a and 38b. The first and second chamber portions 38a and 38b are coaxially arranged in the axial (longitudinal) direction of the body 10 and communicated with each other. The second chamber portion 38b is larger in diameter than the first chamber portion 38a, and one end wall of the second chamber portion 38b constitutes the other distal end of the body 10.

The piezo injector PI1 is provided with a piezo element PE having one end and the other end along the axial direction of the body 10. The one end of the piezo element PE is fixed to the one end wall of the second chamber portion 38b.

The piezo injector PI1 is provided with a first piston 34 and a second piston 36 larger in diameter than the first piston 34 and substantially equal to in diameter the second chamber portion 38b.

The second piston 36 is movably contained in the second chamber 38b such that one end surface thereof opposing the other end of the piezo element PE is fixedly joined thereto. The first piston 34 is movably contained in the first chamber portion 38a such that one end surface thereof is opposite to the other end of the second piston 36.

The body 10 is formed at its inside with a low-pressure fuel passage 9a communicated with the low-pressure fuel passage 9 and with the first chamber portion 38a.

The piezo injector PI1 is provided with a valve containing chamber 25 and a valve 26.

The valve 26 has a substantially spherical end surface and is movably contained in the valve containing chamber 25 such that the spherical end surface of the valve 26 is opposite to the first chamber portion 38a.

The valve containing chamber 25 has one circular end wall opposing the back pressure chamber 20 and the other annular wall opposing the first chamber portion 38a. The other end wall of the valve containing chamber 25 is formed at its center with a passage 27 and is tapered toward the first chamber portion 38a. The tapered annular portion of the other end wall of the valve containing chamber 25 surrounding the passage 27 serves as a valve seat 30 upon which the spherical end surface of the valve 26 can be seated.

The chamber 25 is communicated at its part of the one end wall with the back pressure chamber 20 via a passage 27, and communicated with the first chamber 38a via the orifice.

Specifically, when the valve 26 is rested at its spherical end surface upon the valve seat 30, the low pressure passages 9 and 9a are configured to be separated from the back pressure chamber 20. In contrast, when the valve 26 is moved from the valve seat 30 toward the back pressure chamber 20, the low pressure passages 9 and 9a are communicated with the back pressure chamber 20.

The center portion of the spherical end surface of the valve 26 is jointed to the other end of the first piston 34 via a pressure pin 32 located in the passage 27.

A fluid, such as fuel is contained in the first and second chamber portions 38a and 38b of the cylindrical displacement transfer chamber 38. The first chamber portion 38a is communicated with the high-pressure passage 8a.

The piezo element PE, serving as a piezoelectric stack actuator, is composed of a piezo stack manufactured by pilling up a plurality of piezoelectric elements that are individually contacted electrically. For example, as the piezoelectric elements, PZT (Piezoelectric Zirconate Titanate) elements can be used.

The stack axis of the layered piezo element PE is the axis of linear motion based on inverse piezoelectric effect.

Specifically, the piezo element PE serves as a capacitive load such that the thickness of the layers of the piezo element PE increases by applying a voltage thereto, whereby the total length of the piezo stack increases. In contrast, when no voltage is applied to the layers of the piezo element PE, the thickness of the layers is kept to its original thickness so that the total length of the piezo stack is kept to its original total length.

The piezo element PE is arranged such that the stack axis (the axis of linear motion) is parallel to the axial direction of the first chamber portion 38a.

Specifically, when no voltage is applied to the piezo element PE, the total length of the piezo element PE decreases toward its original total length. As a result, high-pressurized fuel supplied from the high-pressure fuel passages 8 and 8a into the valve containing chamber 26 presses the valve 26 and the first piston 34 toward the piezo element side of the body 10. This allows the valve 26 to be rested upon the valve seat 30, separating the back pressure chamber 20 from the low pressure passages 9 and 9a.

For this reason, the pressure in the fuel contained in the back pressure chamber 20 corresponding to the fuel accumulated in the common rail 6 and the biasing force of the needle spring 24 cause the needle valve 14 to be pressed toward the one distal end (nozzle-side end) of the body 10. The resultant force of the pressure in the fuel contained in the back pressure chamber 20 and the biasing force of the needle spring 24 will be referred to as "valve closing force" hereinafter.

This permits the needle valve 14 to be seated upon the needle seat 16 so that fuel injector PI1 is closed.

In contrast, when a voltage is applied to the piezo element PE so that the piezo element PE longitudinally expands from its original total length, the extension of the piezo element PE causes the second piston 36 and the first piston 34 to move toward the one distal end (nozzle-side end) of the body 10. The movement of the second piston 36 and the first piston 34 allows the valve 26 to move toward the one distal end (nozzle-side end) of the body 10 from the valve seat 30, communicating the back pressure chamber 20 with the low pressure passages 9 and 9a.

For this reason, the pressure in the fuel contained in the back pressure chamber 20 decreases.

At that time, the needle valve 14 is biased toward the piezo-element side end of the body 10 by the force caused by the high-pressurized fuel contained in the needle containing chamber 12. The biasing force caused by the high-pressurized fuel contained in the needle containing chamber 12 will be referred to as "valve opening force" hereinafter.

Based on the reduction in the pressure in the fuel contained in the back pressure chamber 20, when the valve opening force is greater by a predetermined magnitude than the valve closing force, the needle valve 14 is moved from the needle seat 16 so that the fuel injector PI1 is opened.

Returning to FIG. 1, the fuel injection control system is equipped with a fuel pressure sensor 40 and a crank angle sensor 42 as examples of sensors for measuring the operating conditions of the diesel engine 1. In addition, the fuel injection control system is equipped with an acceleration sensor 44.

The fuel pressure sensor 40 is operative to measure the pressure in the fuel contained in the common rail 6 and to output pressure data indicative of the measured pressure.

The crank angle sensor 42 is operative to measure data indicative of a crank angle of the crankshaft 3 of the diesel engine 1 at, for example, regular intervals, and to output the measured data every measurement timing.

The accelerator sensor 44 is operative to measure an actual position or a stroke of an accelerator pedal of the vehicle operable by the driver and to output, as data representing a request torque of the driver, the measured actual position or the stroke of the accelerator pedal.

The fuel injection control system is equipped with an electronic control unit (ECU) 50 including a microcomputer 51 and an I/O interface I/O electrically connected to the microcomputer 51 and the piezo element PE of each of the piezo injectors PI1 to PIN.

The microcomputer 51 consists of a CPU and a storage unit replaceably or permanently integrated with at least one of various types of storage media, such as a volatile/nonvolatile storage medium.

The I/O interface I/O is electrically connected to the sensors 40, 42, and 44, and the metering valve 5. The I/O interface I/O is operative to:

receive pieces of data output from the sensors 40, 42, and 44;

convert the received pieces of data to be recognizable by the microcomputer 51 as need arises;

apply a drive voltage to the piezo element PE of each of the piezo injectors PI1 to PIN; and send a predetermined control command to the metering valve 5.

The storage unit has stored therein maps M1 and M2 and programs P that cause the ECU 50 to execute various tasks including a fuel injection control task for control of the output of the diesel engine 1.

Specifically, in accordance with at least one program P, the ECU 50 controls the drive of various actuators installed in the diesel engine 1, such as the piezo element PE of each injector, using the maps M1 and M2 and the received pieces of data supplied from the sensors 40, 42, and 44, thus executing the fuel injection control task.

Figure 3A:
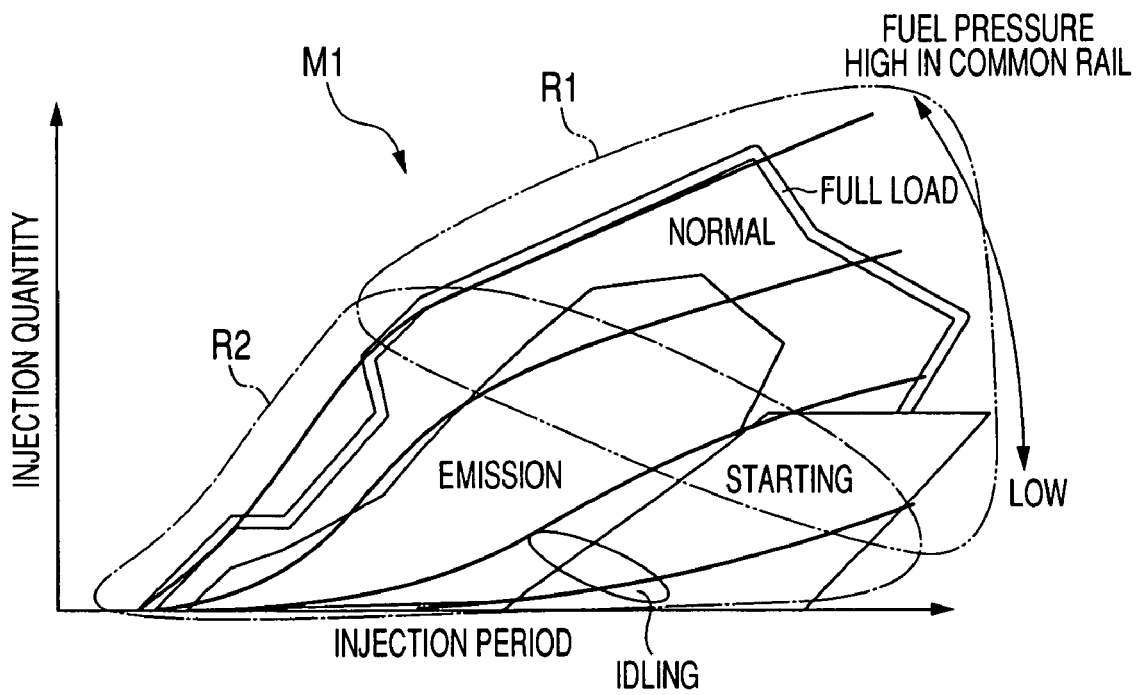
FIG. 3A is a view schematically illustrating a map indicative of a relationship between a variable of a fuel injection period and a variable of an injection quantity for each of the piezo injectors illustrated in FIG. 1, and illustrating operating regions on the map.

As illustrated in FIG. 3A, in the first embodiment, each of the maps M1 and M2 is composed of, for example, a data table and/or a program. The map M1 represents a relationship between a variable of the fuel injection period (duration) and a variable of the injection quantity (Q) for each of the piezo injectors PI1 to PI4; this relationship has been determined by simulations and/or tests.

For example, in the first embodiment, the ECU 50 is operative to compute a command injection quantity of each of the piezo injectors PI1 to PIN based on a rotation speed of the crankshaft 3 and the data indicative of the measured stroke of the accelerator pedal. The rotation speed of the crankshaft 3 is obtained based on the data indicative of the measured crank angle of the crankshaft 3.

Next, the ECU 50 is operative to reference the map M1 using the computed command injection quantity to convert the computed command injection quantity into a command injection period corresponding thereto on the map M1.

Then, the ECU 50 is operative to apply a drive voltage to the piezo element PE of each of the piezo injectors PI1 to PIN during the command injection period.

This allows the piezo element PE of each of the piezo injectors PI1 to PIN to increase in length during the command injection period so as to move the needle valve 14 from the needle seat 16, making it possible to open each of the fuel injectors PI1 to PIN during the command injection period.

Note that the map M1 illustrated in FIG. 3A determines, as the reference between a variable of the fuel-injection period and a variable of the fuel injection quantity for each of the piezo injectors PI1 to PI4, a plurality of two-dimensional curves C1 to C4 each representing fuel quantity versus fuel injection. The plurality of two-dimensional curves vary depending on changes in the pressure of the fuel accommodated in the common rail 6.

Specifically, as illustrated in FIG. 3A, upon the pressure in the fuel accommodated in the common rail 6 being kept constant, the more the fuel quantity increases, the longer the fuel injection period is.

Upon the fuel injection quantity being kept constant, the more the pressure in the fuel accommodated in the common rail 6 increases, the shorter the fuel injection period is.

Figure 3B:
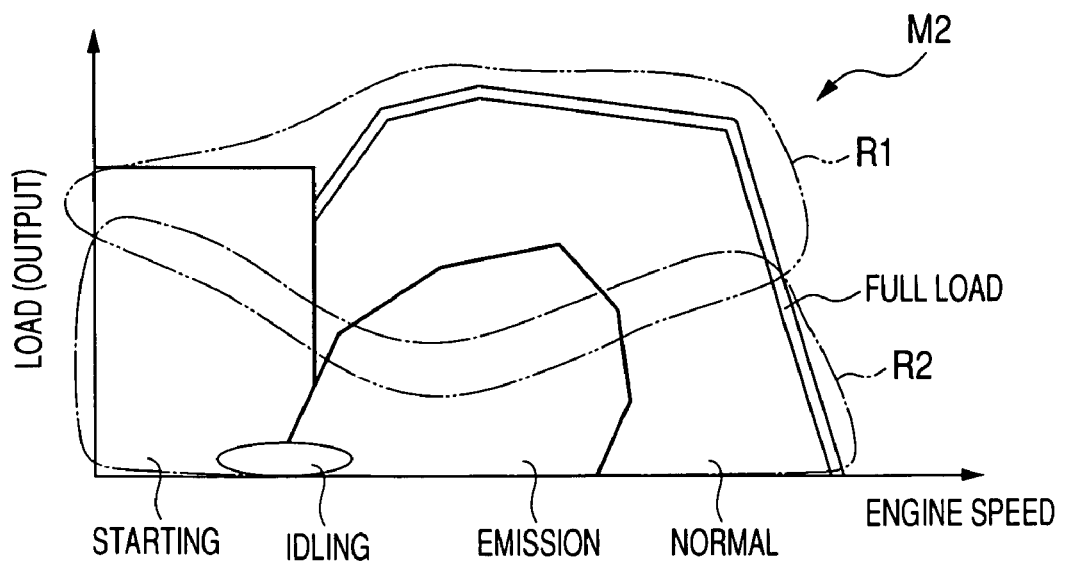
FIG. 3B is a view schematically illustrating a map indicative of a relationship between a variable of an engine speed and a variable of a load torque for each of the piezo injectors illustrated in FIG. 1, and illustrating the operating regions on the map.

FIG. 3A also represents a relationship between each of the two-dimensional curves C1 to C4 representing fuel injection versus fuel injection and operating regions of the diesel engine 1. The operating regions of the diesel engine 1 are determined by the engine speed (rotation speed of the crankshaft 3) and a load torque (output) to be applied to the diesel engine 1 (see FIG. 3B). The load torque to be applied to the diesel engine 1 can be obtained by the data indicative of the measured stroke of the accelerator pedal.

Specifically, the operating regions include:

an idling region representing the first operating conditions of the diesel engine 1 as it turns over at low speed with a low load, in other words, a throttle of the vehicle being turned low;

a starting region representing the second operating conditions of the diesel engine 1 from the cranking of the diesel engine 1 by a starter motor up to the engine speed reaching an idling speed;

an emission region representing the third operating conditions of the diesel engine 1 have a large influence on the exhaust characteristics in a predetermined driving pattern, such as 10-15 mode driving pattern;

a normal region representing the fourth operating conditions of the diesel engine 1 except for the first to third operating conditions thereof; and a full load region representing part of the fourth operating conditions of the diesel engine 1 where the accelerator pedal is fully depressed (the stroke of the accelerator pedal is full) so that the throttle is fully open.

The 10-15 mode driving pattern has been used in Japan for emission certification and fuel economy for light duty vehicles.

In one of the operating regions in which the command injection quantity is comparatively long, the needle valve 14 can be moved up to its full list so as to abut on the needle stopper 21. After the displacement of the needle valve 14 becomes its full lift stroke, the needle valve 14 does not increase in displacement.

Figure 4:
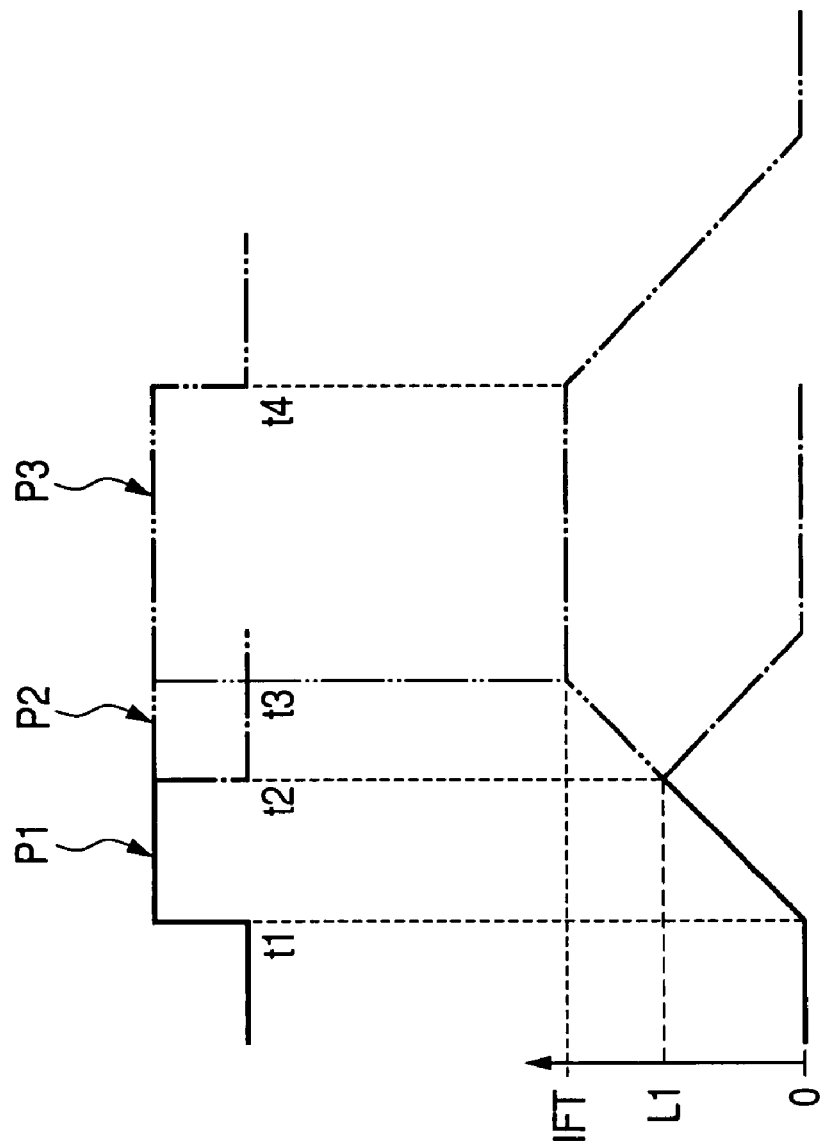
FIG. 4 is a view schematically illustrating a relationship between a command injection period and change in lift amount of a needle valve illustrated in FIG. 2 according to the first embodiment.

FIG. 4 schematically illustrates a relationship between a command injection period corresponding to, for example, a pulse width of a voltage applied to the piezo element PE and change in lift amount of the needle valve 14.

As illustrated in FIG. 4, when a command injection period P1 is set to a pulse width between t2-t1, the displacement of the needle valve 14 becomes a lift stroke shorter than its predetermined full lift stroke.

When a command injection period P2 is set to a pulse width between t3-t1 longer than the command injection period P1, the displacement of the needle valve 14 becomes the full lift stroke.

In addition, even if a command injection period P3 is set to a pulse width between t4-t1 longer than the command injection period P2, the displacement of the needle valve 14 is kept unchanged at the full lift until the fuel injection corresponding to the command injection period P3 is completed.

After the needle valve 14 is moved by its full lift stroke in one of the operating regions of the diesel engine 1, the lift stroke of the needle valve 14 is kept unchanged. For this reason, the rate of fuel to be injected by a piezo injector per unit of time during a command injection period contained in a full-lift injection region R1 is different from that of the corresponding piezo injector during a command injection period contained in a normal injection region R2. The full-lift injection region R1 represents a region in which the displacement of needle valve 14 is moved up to its full lift position. The normal-lift region R2 represents a region in which the displacement of needle valve 14 is within the limits shorter than its full lift stroke.

Thus, in the full-lift injection region R1 surrounded by the two-dot change line illustrated in FIG. 3A, the slopes of the curves C1 to C4 each representing fuel injection versus fuel injection are different from those thereof in the normal injection region R2.

Note that, in the configuration of each of the piezo injectors PI1 to PIN, as illustrated in FIG. 5, direct contact between the needle valve 14 and the needle seat 16 may cause the wearing out of at least one of the needle valve 14 and the needle seat 16.

Similarly, in the configuration of each of the piezo injectors PI1 to PIN, as illustrated in FIG. 5, direct contact between the needle valve 14 and the needle stopper 21 may also cause the wearing out of at least one of the needle valve 14 and the needle stopper 21.

For example, the wearing out of the one end (nozzle-side end) of the needle valve 14 by Δ1 causes the full lift stroke of the needle valve 14 to increase by Δ1, and the wearing out of the needle seat 16 by Δ2 causes the full lift stroke of the needle valve 14 to increase by Δ2.

Similarly, the wearing out of the needle stopper 21 by Δ3 causes the full lift stroke of the needle valve 14 to increase by Δ3, and the wearing out of the other end (back-side end) of the needle valve 14 to be directly contacted on the needle stopper 21 by Δ4 causes the full lift stroke of the needle valve 14 to increase by Δ4.

Changes in the full lift stroke of one of the piezo injectors PI1 to PIN causes the injection characteristics thereof to change. It is therefore desired to learn the amount of deviation from the injection characteristics of each of the piezo injectors PI1 to PIN due to the changes in its full lift stroke in order to compensate the variations in the injection characteristics thereof.

The learning of the amount of deviation from the injection characteristics of each of the piezo injectors PI1 to PIN due to the variations in its full lift stroke cannot be executed in the normal injection region R2 surrounded by the dashed line illustrated in FIG. 3A.

This is because, in the normal injection region R2, secular variations in the injection characteristics of each of the piezo injectors PI1 to PIN do not depend on the variations in its full lift stroke but on variations in the flow passages of pressurized fuel in a corresponding one of the piezo injectors PI1 to PIN.

Accordingly, it is difficult to learn the variations in the full lift stroke of each of the piezo injectors PI1 to PIN using the behavior of the crankshaft 3 during execution of a plurality of pilot fuel injections under idling speed control of the internal combustion engine 1, which has been described in the conventional U.S. Patent Publication.

In addition, the operating conditions of the diesel engine 1 in the full-lift injection region R1 in which the needle valve 14 of each of the piezo injectors PI1 to PIN is moved up to its full lift position cause an injection quantity sprayed therefrom to increase. For this reason, the variations in the fuel injection characteristics of each of the fuel injectors in the full-lift region R1 may cause the variations in the output characteristics including the exhaust characteristic and/or the output torque of the diesel engine 1.

Thus, it is desired to learn, in the full-lift injection region R1 in which the needle valve 14 is moved up to its full lift position, the amount of deviation from the fuel injection characteristics of each of the piezo injectors PI1 to PIN due to the variations in the full lift stroke of the needle valve 14.

In order to implement the desire, the fuel injection control system is configured to:

detect, based on the behavior of the crankshaft 3 when a plurality of pilot fuel injections by each of the piezo injectors PI1 to PIN are carried out per combustion cycle of the diesel engine 1, a minimum interval between temporally adjacent injection periods of temporally adjacent pilot fuel injections; these adjacent injection periods are not overlapped from each other; and learn the amount of deviation from the injection characteristics due to the variations in the full lift stroke of the needle valve 14 of each of the piezo injectors PI1 to PIN based on the detected minimum interval.

The minimum interval detecting task and the learning task to be executed by the fuel injection control system will be described hereinafter.

(a1) of FIG. 6A schematically illustrates an interval Ti between temporally adjacent command injection periods (pulse widths of applied voltages) P1 and P2 of temporally adjacent pilot fuel injections f1 and f2 by a piezo injector #i in which the full lift stroke of the needle valve 14 is originally kept unchanged. To the piezo injector i, the identifier number i ($1 \leq i \leq N$) is assigned.

(b1) of FIG. 6A schematically illustrates an actual minimum interval INTmin between corresponding actual injection periods IP1 and IP2 that are temporally adjacent to and not overlapped from each other, represented as the variations in the lift amount of the needle valve 14 of the piezo injector #i.

As illustrated in (a1) and (b1) of FIG. 6A, the full lift stroke Lf of the needle valve 14 is originally kept unchanged. For this reason, the interval Ti between adjacent command injection periods P1 and P2 of adjacent pilot fuel injections f1 and f2 by a piezo injector #i coincides with the actual minimum interval INTmin between corresponding actual injection periods IP1 and IP2 that are not overlapped from each other.

Specifically, when the former fuel injection f1 by the piezo injector #i during the predetermined command injection period P1 between timing t11 and timing t10 is completed at timing t11, the total length of the piezo element PE starts to decrease. The reduction in the total length of the piezo element PE allows the valve 26 to move toward the valve seat 30, causing the needle valve 14 to move toward the needle seat 16. Therefore, the needle valve 14 is seated on the needle seat 16 so that the actual injection period IP1 is completed at timing t12.

When the needle valve 14 is rested on the needle seat 16, the ECU 50 starts to supply a drive voltage for the next fuel injection f2 to the piezo element PE at timing t12. This allows the drive voltage to be applied on the piezo element PE during the predetermined command injection period P2 between timing t13 and timing t12.

As described above, after the needle valve 14 being rested on the needle seat 16 at timing t12, the drive voltage for the latter fuel injection f2 is started to be supplied to the piezo element PE. For this reason, the actual injection periods IP1 and IP2 of the adjacent pilot fuel injections f1 and f2 are not overlapped from each other.

(a2) of FIG. 6B schematically illustrates the interval Ti between adjacent command injection periods P1 and P2 of adjacent pilot fuel injections f1 and f2 by the piezo injector #i in which the full lift stroke Lf of the needle valve 14 increases by, for example, ΔLf.

(b2) of FIG. 6B schematically illustrates an actual interval between corresponding actual adjacent injection periods IP1 and IP2 represented as the variations in the lift amount of the needle valve 14 of the piezo injector #i.

Specifically, when the former fuel injection f1 by the piezo injector #i during the predetermined command injection period P1 between timing t11 and timing t10 is completed at timing t11, the total length of the piezo element PE starts to decrease. The reduction in the total length of the piezo element PE allows the valve 26 to move toward the valve seat 30, causing the needle valve 14 to move toward the needle seat 16.

However, before the needle valve 14 is rested on the needle seat 16 at timing t12, the ECU 50 starts to supply a drive voltage for the latter fuel injection f2 to the piezo element PE at timing t12. This causes the actual injection periods IP1 and IP2 of the adjacent pilot fuel injections f1 and f2 to be overlapped from each other.

(a3) of FIG. 6C schematically illustrates an amount ΔT of increase in the interval Ti between adjacent command injection periods P1 and P2 of adjacent pilot fuel injections f1 and f2 by the piezo injector #i by, for example, delaying the start timing of the latter fuel injection f2.

(b3) of FIG. 6C schematically illustrates an actual minimum interval between actual injection periods IP1A and IP2A that are not overlapped from each other based on the delay of the start timing of the latter fuel injection f2, represented as the variations in the lift amount of the needle valve 14 of each piezo injector.

The increase in the interval between adjacent command injection periods P1 and P2 of adjacent pilot fuel injections f1 and f2 by the piezo injector #i depends on the increase in the full lift stroke Lf of the needle valve 14.

Specifically, when the interval between adjacent command injection periods P1 and P2 of adjacent pilot fuel injections f1 and f2 by each piezo injector is corrected to increase from Ti to Ti+ΔT due to the amount ΔLf of increase in the full lift stroke Lf, the amount ΔLf increase in the full lift stroke can be represented by the following equation using a displacement velocity "b/a" of the needle valve 14 (see (b3) and (c3) of FIG. 6C):

$$\Delta Lf = b/a \times (\Delta T)$$

The equation clearly shows that the amount ΔLf of increase in the full lift stroke Lf is relative to the amount ΔT of increase in the interval Ti.

Thus, it is possible to learn the amount ΔLf of increase in the full lift stroke Lf by calculating and/or measuring the amount ΔT of increase in the interval Ti between adjacent command injection periods P1 and P2.

In addition, the difference between the sum of injection quantities of the former and latter pilot fuel injections f1 and f2 after correction and that of injection quantities of the former and latter pilot fuel injections f1 and f2 before correction is equivalently represented as the difference between an area AR1 and an area AR2.

That is, the area AR1 corresponds to the reduction of the sum of injection quantities of the former and latter pilot fuel injections f1 and f2 after correction from that of injection quantities of the former and latter pilot fuel injections f1 and f2 before correction. The area AR2 corresponds to the addition of the sum of injection quantities of the former and latter pilot fuel injections f1 and f2 before correction to that of injection quantities of the former and latter pilot fuel injections f1 and f2 after correction.

As illustrated in (a3) of FIG. 6C, a height h1 of the area AR1 is greater than the increase ΔT that is greater than a height h2 of the area AR2. For this reason, the sum of injection quantities of the former and latter pilot fuel injections f1 and f2 illustrated in (b3) of FIG. 6C is smaller than that of injection quantities of the former and latter pilot fuel injections f1 and f2 illustrated in (b2) of FIG. 6B.

The reduction of the sum of injection quantities of the former and latter pilot fuel injections after the correction of the minimum interval between adjacent command injection periods P1 and P2 of adjacent pilot fuel injections f1 and f2 by the piezo injector #i causes the rotation speed of the crankshaft 3 to decrease.

For this reason, while enlarging the interval between adjacent command injection periods, the ECU 50 determines whether the rotation speed of the crankshaft 3 is reduced by over a predetermined threshold. When it is determined that the rotation speed of the crankshaft 3 is reduced by over the predetermined threshold, the ECU 50 determines that corresponding actual injection periods are not overlapped from each other.

Figure 7:
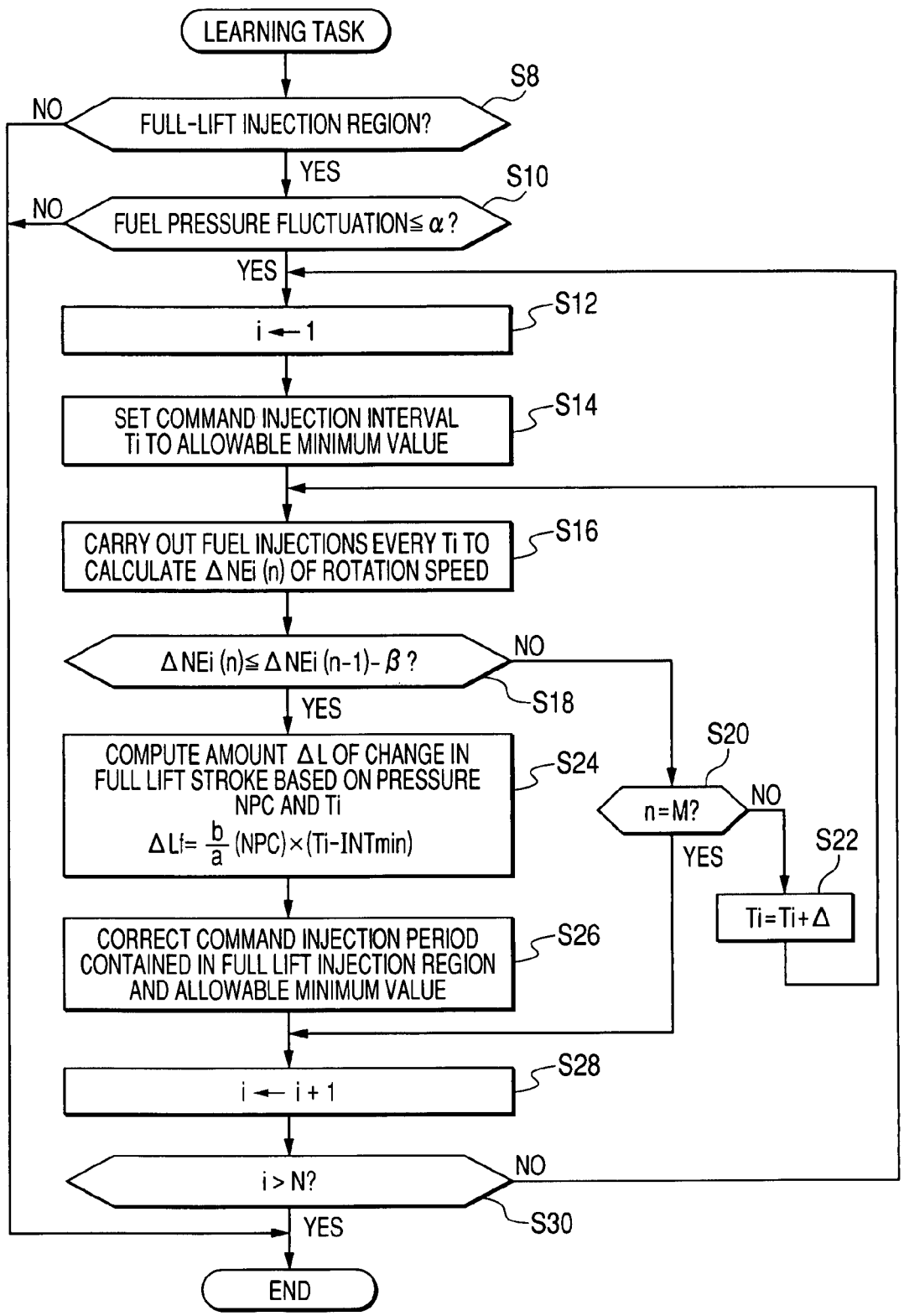
FIG. 7 is a flowchart schematically illustrating processes to be executable by an ECU illustrated in FIG. 1 for executing a minimum interval detecting task and a learning task according to the first embodiment.

FIG. 7 schematically illustrates processes to be executable by the ECU 50 in accordance with at least one program stored in the storage unit for executing the minimum interval detecting task and the learning task.

For example, the sequence of the processes is repeatedly executed by the ECU 50 every cycle of, for example, 5,000 km of driving, measured by a trip meter 55 connected to the ECU 50 via the I/O interface 51c.

Every cycle of 5,000 km of driving, the ECU 50 determines whether the operating conditions of the diesel engine 1 belong to the full-lift injection region R1 based on the map M2, the engine speed (rotation speed of the crankshaft 3) obtained by the measured data sent from the crank angle sensor 42, and the measured stroke of the accelerator pedal sent from the accelerator sensor 44 in step S8.

When it is determined that the operating conditions of the diesel engine 1 do not belong to the full-lift injection region R1 (the determination in step S8 is NO), the ECU 50 exits the processes for executing the minimum interval detecting task and the learning task illustrated in FIG. 7.

Otherwise, when it is determined that the operating conditions of the diesel engine 1 belong to the full-lift injection region R1 (the determination in step S8 is YES), the ECU 50 proceeds to step S10.

In step S10, the ECU 50 determines whether the fluctuations in the pressure of the fuel contained in the common rail 6 are kept equal to or more than a predetermined threshold α in either direction. The action in step S10 is required to determine whether the pressure of the fuel accumulated in the common rail 6 is kept stable.

Specifically, even if the diesel engine 1 operates in steady state, the pressure of the fuel accumulated in the common rail 6 cyclically fluctuates due to repeated injections of the fuel contained in the common rail 6 and the repeated pumping transfers of fuel by the fuel pump 4 into the common rail 6. For this reason, in order to prevent the execution of the learning task during the pressure of the fuel accommodated in the common rail 6 fluctuating, setting of the predetermined threshold α preferably allows the pressure in the fuel accumulated in the common rail 6 to be kept to a constant target pressure or thereabout.

That is, when it is determined that the fluctuations in the pressure of the fuel contained in the common rail 6 are not kept equal to or greater than the predetermined threshold α in either direction, the determination in step S10 is negative. Then, the ECU 50 exits the actions for executing the minimum interval detecting task and the learning task illustrated in FIG. 7.

Otherwise, when it is determined that the fluctuations in the pressure of the fuel contained in the common rail 6 are kept equal to or greater than the predetermined threshold α in either direction, the determination in step S10 is affirmative. Then, the ECU 50 proceeds to step S12.

In step S12, the ECU 50 sets, to "1", a parameter "i" indicative of identifier numbers "1" to "N" of the cylinders #1 to #N. Next, in step S14, the ECU 50 sets a command injection interval Ti between adjacent command injection periods of adjacent pilot fuel injections into the cylinder #i to an allowable minimum value. The allowable minimum value is factory-determined based on an actual minimum interval INTmin between actual adjacent injection periods that are not overlapped from each other in accordance with the pressure of the fuel accommodated in the common rail 6.

In step S16, the ECU 50 applies, for example, a predetermined pulse voltage to the corresponding piezo injector every command injection period Ti to drive it, thus carrying out fuel injections every command injection period Ti.

In addition, in step S16, the ECU 50 computes, based on the measured data of the crank angle sensor 42, a current sampling value ΔNEi(n) of the rotation speed of the crankshaft 3 that rotates as the cylinder #i is combusted when the corresponding piezo injector PIi caries out fuel injections every injection period Ti.

Specifically, in step S16, the ECU 50 measures an instantaneous change in the rotation speed of the crankshaft 3 within a period in which energy generated by the combustion cycle of the cylinder #i is reflected to the behavior of the crankshaft 3.

Subsequently, in step S18, the ECU 50 determines whether the current sampling value ΔNEi(n) of the rotation speed of the crankshaft 3 rotating with the cylinder #i being combusted is equal to or lower than a value obtained by subtracting a predetermined value β from a previous sampling value ΔNEi (n−1) of the rotation speed of the crankshaft 3. The process in step S18 is to determine whether an actual adjacent injection periods is shifted from being overlapped with each other into being non-overlapped with each other.

As set forth above and illustrated in FIGS. 6A to 6C, an injection quantity to be metered into the cylinder #i decrease as actual adjacent injection periods are shifted from being overlapped with each other into being non-overlapped with each other.

For this reason, when it is determined that the current sampling value ΔNEi(n) is equal to or lower than the value obtained by subtracting the predetermined value β from the previous sampling value ΔNEi(n−1), the determination in step S18 is affirmative. Then, the ECU 50 proceeds to step S24.

Otherwise, when it is determined that the current sampling value ΔNEi(n) is greater than the value obtained by subtracting the predetermined value β from the previous sampling value ΔNEi(n−1), the determination in step S18 is negative. Then, the ECU 50 proceeds to step S20.

In step S20, the ECU 50 determines whether the sampling number n reaches a predetermined number M.

The process in step S20 is to determine that actual adjacent injection periods are originally non-overlapped with each other when variations equal to or greater than the predetermined value β do not appear in the sampling value ΔNEi during the M number of samplings.

When it is determined that the sampling number n does not reach the predetermined number M (the determination in step S20 is NO), the ECU 50 increments the injection period Ti by Δ in step S22, returning to step S16 and repeating the processes in steps S16 to S22 until the determination in the process in step S18 or S20 is affirmative.

The processes in steps S16 to S22 are to determine a corrected command injection interval Ti in which actual adjacent injection periods are shifted from being overlapped with each other into being non-overlapped with each other (see (a2), (b2), (a3), and (b3) of FIGS. 6B and 6C).

Specifically, when the determination in step S18 is affirmative, the ECU 50 determines that the corrected command injection interval Ti allows actual adjacent injection periods to be non-overlapped with each other. Then, the ECU 50 proceeds to step S24.

In step S24, the ECU 50 computes the amount ΔLf of change in the full lift stroke Lf of the piezo injector PIi in accordance with the following equation [1] based on the corrected command injection period Ti and the pressure NPC of the fuel accumulated in the common rail 6:

$$\Delta Lf = \frac{b}{a}(NPC) \times (Ti - \text{INTmin}) \quad [1]$$

where the term "Ti-INTmin" represents the amount of change in the minimum interval INTmin, and the term $$\text{“}\frac{b}{a}(NPC)\text{”}$$

represents the rate of decrease in the lift amount of the needle valve 14 of the piezo injector PIi determined by the pressure NPC of the fuel accumulated in the common rail 6.

Thus, in step S26, the ECU 50 corrects the command injection periods contained in the full lift injection region R1 based on the computed amount ΔLf of change in the full lift stroke Lf of the piezo injector PIi and a corresponding one of the values of the pressure of the fuel accumulated in the common rail 6.

In addition, the ECU 50 corrects the allowable minimum values based on the computed amount ΔLf of change in the full lift stroke Lf of the piezo injector PIi and a corresponding one of the values of the pressure of the fuel accumulated in the common rail 6.

Specifically, in step S26, the ECU 50 grasps the variations in the rate of fuel to be injected by the piezo injector PIi per unit of time and/or the command injection period for the piezo injector PIi based on the computed amount ΔLf of change in the full lift stroke Lf of the piezo injector PIi and a corresponding one of the values of the pressure of the fuel accumulated in the common rail 6.

Figure 8A:
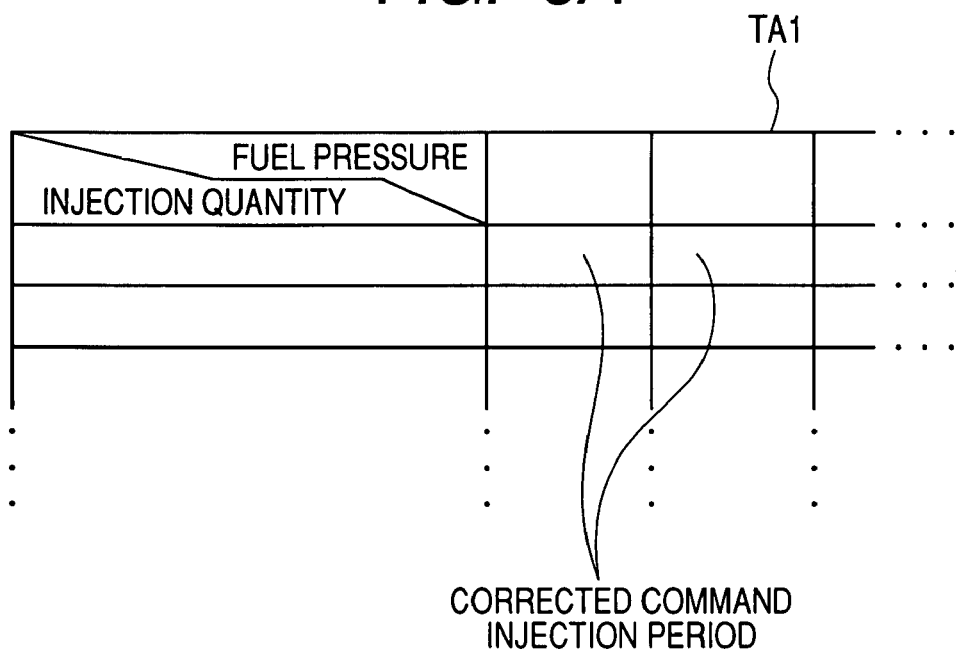
FIG. 8A is a view schematically illustrating a table for storing therein computed corrected command injection periods.

Therefore, in step S26, the ECU 50 provides a table TA1 whose recodes are associated with a variable of the pressure of the fuel accumulated in the common rail 6 and with a variable of the injection quantity; these variables are contained in the full-lift injection region R1 of the map M1 (see FIG. 8A).

Next, in step S26, the ECU 50 computes the corrected command injection periods based on the computed amount ΔLf of change in the full lift stroke Lf of the piezo injector PIi and each of the values of the pressure of the fuel accumulated in the common rail 6, thus storing the computed corrected command injection periods into the corresponding recodes of the table TA1, respectively.

Figure 8B:
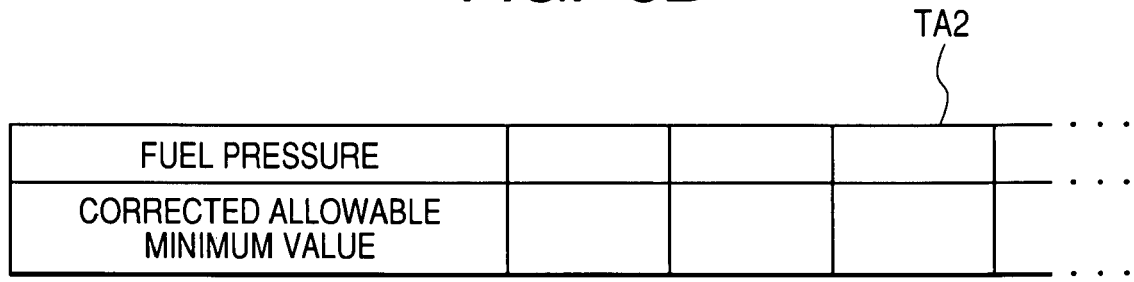
FIG. 8B is a view schematically illustrating a table for storing therein computed corrected allowable minimum values.

In addition, in step S26, the ECU 50 provides a table TA2 whose recodes are associated with a variable of the pressure of the fuel accumulated in the common rail 6; this variable is contained in the full-lift injection region R1 of the map M1 (see FIG. 8B).

Next, in step S26, the ECU 50 computes the corrected allowable minimum values based on the computed amount $\Delta Lf$ of change in the full lift stroke Lf of the piezo injector PIi and each of the values of pressure of the fuel accumulated in the common rail 6, thus storing the computed corrected allowable minimum values into the corresponding recodes of the table TA2, respectively.

After completion of the process in step S26, the ECU 50 proceeds to step S28. In step S28, the ECU 50 increments the parameter "i" by 1, and determines whether the parameter "i" exceeds the number N of cylinders in step S30. The process in step S30 is to determine whether the learning of the injection period and the allowable minimum value has been completed in all of the cylinders #1 to #N.

Specifically, when it is determined that the parameter "i" is equal to or lower than the number N of cylinders (the determination in step S30 is NO), the ECU 50 determines that the learning of the injection period and the allowable minimum value has not been completed yet in all of the cylinders #1 to #N. Then, the ECU 50 returns to step S12 and repeatedly executes the processes in steps S12 to S30 until the determination in step S30 is affirmative.

Otherwise, when it is determined that the parameter "i" exceeds the number N of cylinders (the determination in step S30 is YES), the ECU 50 determines that the learning of the injection period and the allowable minimum value has been completed in all of the cylinders #1 to #N. Then, the ECU 50 exits the actions for executing the minimum interval detecting task and the learning task illustrated in FIG. 7.

The processes illustrated in FIG. 7 allow the learning of the injection period and the allowable minimum value for each of the piezo injectors PI1 to PIN to be carried out during the pressure of the fuel accumulated in the common rail 6 being stable without limit under idling speed control.

As set forth above, the fuel injection control system is configured to obtain a minimum interval between actual adjacent injection periods, which are non-overlapped with each other, of adjacent pilot fuel injections by each of the piezo injectors PI1 to PIN based on the behavior of the crankshaft 3 being changed during the pilot fuel injections.

The use of the obtained minimum interval therefore allows the amount of deviation from the fuel injection characteristics of each of the piezo injectors PI1 to PIN due to the variations in the full lift stroke of the needle valve 14 to be learned as the first effect of the first embodiment.

In the first embodiment, as the amount of deviation from the fuel injection characteristics of each of the piezo injectors PI1 to PIN, the amount of change in the command injection periods and the amount of change in the allowable minimum values that determine a minimum interval between the command injection periods can be learned.

The fuel injection control system is designed to:

change an interval between command injection periods of pilot fuel injections by each of the piezo injectors PI1 to PIN; and obtain a minimum interval between actual adjacent injection periods, which are non-overlapped with each other, of adjacent pilot fuel injections by each of the piezo injectors PI1 to PIN based on the amount of change in the rotation speed of the crankshaft 3 being equal to or greater than the predetermined value $\beta$ with the detected interval being changed.

This makes it possible to, as the second effect, properly obtain a minimum interval between actual adjacent injection periods, which are non-overlapped with each other, of adjacent pilot fuel injections by each of the piezo injectors PI1 to PIN.

The fuel injection control system is configured to learn the amount of deviation from the fuel injection characteristics of an arbitral one piezo injector due to the variations in the full lift stroke of the needle valve 14 by changing an interval between command injection periods of pilot fuel injections by the arbitral one piezo injector.

This allows the interval between command injection periods of pilot fuel injections by the arbitral one piezo injector to be identified as the factor of changing the behavior of the crankshaft 3. This makes it possible to, as the third effect, properly obtain a minimum interval between actual adjacent injection periods, which are non-overlapped with each other, of adjacent pilot fuel injections by the arbitral one piezo injector.

The fuel injection control system is configured to learn the amount of deviation from the fuel injection characteristics of each piezo injector when the fluctuations in the pressure of the fuel contained in the common rail 6 are kept equal to or greater than the predetermined threshold $\alpha$ in either direction. This can effectively reduce, as the fourth effect, the influence of the fluctuations of the pressure of the fuel accommodated in the common rail 6 during the learning of the amount of deviation from the fuel injection characteristics of each piezo injector.

The fuel injection control system is configured to compute the amount $\Delta Lf$ of charge in the full lift stroke Lf of each of the piezo injectors PI1 to PIN as a parameter indicative of the amount of deviation from the fuel injection characteristics of a corresponding one of the piezo injectors PI1 to PIN due to the variations in the full lift stroke of the needle valve 14.

Thus, as the fifth effect, it is possible to compute the amount of correction of the injection characteristics over the whole of the full-lift injection region R1 based on the learned amount $\Delta Lf$ of change in the full lift stroke Lf of each of the piezo injectors PI1 to PIN.

Specifically, as the sixth effect, correction of the command injection periods and the allowable minimum values based on the amount $\Delta Lf$ of change in the full lift stroke Lf of each piezo injector can prevent actual adjacent injection periods from being overlapped with each other, and can reduce the increase in the injection quantity of each of the pilot fuel injections.

The fuel injection control system is designed to calculate the amount of correction of the command fuel injection for each of sections divided by the variations in the pressure of the fuel accommodated in the common rail 6. This makes it possible to, as the seventh effect, compensate the amount $\Delta Lf$ of change in the full lift stroke Lf of each piezo injector to be matched with the pressure of the fuel accommodated in the common rail 6.

Second Embodiment

A fuel injection control system according to a second embodiment of the present invention will be described hereinafter with emphasis on the difference points from the structure and operations of the fuel injection control system according to the first embodiment.

The diesel engine according to the second embodiment includes a plurality of piezo injectors PI1A to PINA for the respective cylinders #1 to #N.

Figure 9:
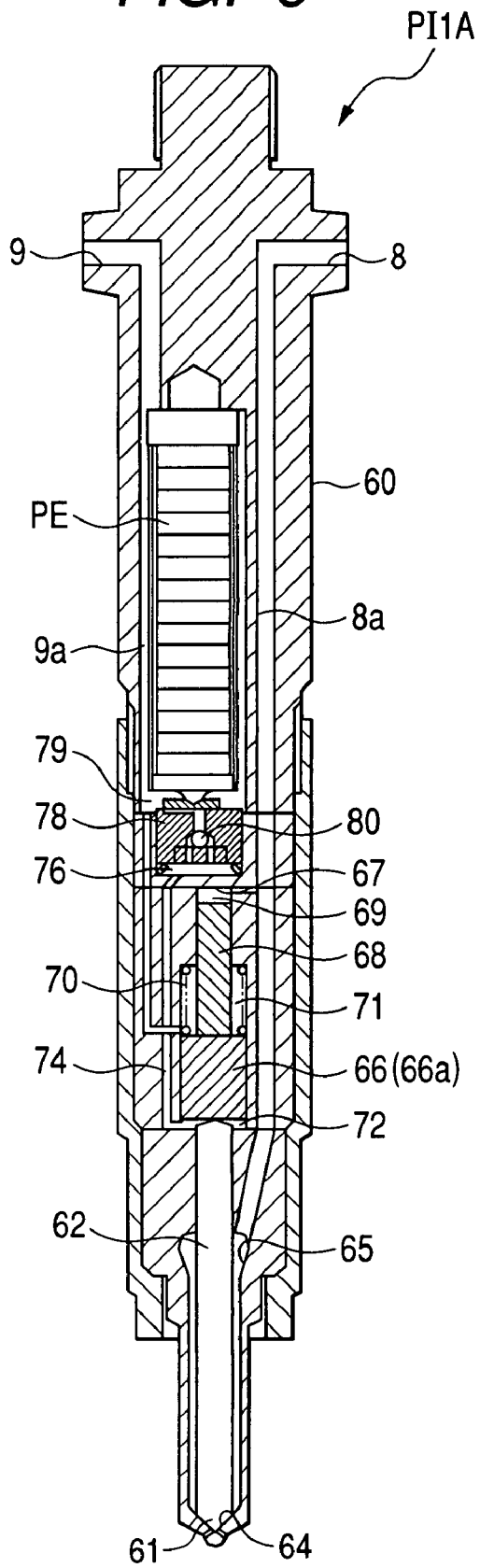
FIG. 9 is a longitudinal cross sectional view of a piezo injector according to a second embodiment of the present invention.

FIG. 9 schematically illustrates an example of the structure of a piezo injector PI1A. Note that the other piezo injectors PI2A to PINA have the same structure of the piezo injector PI1A.

The piezo injector PI1A consists of a substantially cylindrical body (housing) 60. The body 60 is formed at its one end (one distal end) with a nozzle 61 at the center thereof. The body 60 is formed at the other end side with a pair of port into which the high-pressure fuel passage 8 and the low-pressure fuel passage 9 are coupled to be communicated.

The body 60 is also formed at the interior with a cylindrical needle chamber 65, a first oil-tight chamber 72, a needle piston containing chamber 66a, a back-pressure chamber 71, a balance chamber 69, and a second oil-tight chamber 76 arranged in the length direction of the body 60 in this order from one end portion thereof.

The body 60 is formed with a communication passage 74 communicating between the first and second oil-tight chambers 72 and 76.

The needle chamber 65 is communicated with the nozzle 61 of the one distal end of the body 60. The one distal end of the body 60 constitutes one end wall of the needle chamber 65. An annular inner surface of the one end wall of the chamber 65 surrounding the nozzle 61 constitutes a needle seat 64.

The piezo injector PI1A is provided with a substantially cylindrical needle valve 62 arranged to be contained in the needle chamber 65 such that:

its one end is opposite to the nozzle 61; and the other end (back-side end) is contained in the first oil-tight chamber 72.

The piezo injector PI1A is provided with a substantially cylindrical needle piston 66 contained in the needle piston containing chamber 66a and joined at its one end to the other end of the needle valve 62. The needle piston 66 is arranged in the longitudinal direction of the body 60, and is greater in diameter than the needle valve 62.

The arrangement and structure of the needle piston 66 allows the first oil-tight chamber 72 to be formed between the other end of the needle valve 62, an inner wall of the body 60 therearound, and the one end surface of the needle piston 66.

The piezo injector PI1A is provided with a balance piston 68 joined at its one end with the other end of the needle piston 66 and arranged in the longitudinal direction of the body 60. The balance piston 68 is contained in the back pressure chamber 71.

The piezo injector PI1A is provided with a spring 70. The spring 70 is inserted in the back pressure chamber 71 between the other end of the needle piston 66 and the inner wall surrounding the balance piston 68. The spring 70 works to urge the needle piston 66 toward the needle seat 64.

The balance chamber 69 arranged opposing to the other end of the balance piston 68 is formed by; the other end surface of the balance piston 68, an inner wall of the body 60 therearound, and a partitioning wall. The portioning wall is arranged opposing the other end surface of the balance piston 68 for partitioning a portion in which the valve assembly is installed with the remaining portion.

The balance chamber 69 allows the valve assembly composed of the needle valve 62, the needle piston 66, and the balance piston 68 to be movable in its axial direction (the longitudinal direction of the body 60). The partitioning wall serves as a stopper 67 for limiting the displacement of the balance piston 68 toward the other end side direction of the body 60.

The body 60 is formed at its inside with a high-pressure fuel passage 8a communicable with the corresponding high-pressure fuel passage 8 via the port, with the needle chamber 65, and with the balance chamber 69.

This allows the high-pressurized fuel to be supplied from the common rail 6 into each of the needle chamber 65 and the balance chamber 69 via the high-pressure fuel passages 8 and 8a.

The body 60 is formed at its inside with a low-pressure fuel passage 9a communicated with the low-pressure fuel passage 9 via the port and with the back pressure chamber 71.

The piezo injector PI1A is provided with a piezo piston 78 contained in a containing chamber 79 communicated with the low-pressure fuel passage 9a and arranged opposing the portioning wall (stopper) 67. This configuration allows the second oil tight chamber 76 to be formed between the piezo piston 78 and the portioning wall 67. Fuel is filled in the first oil tight chamber 72, the communication passage 74, and the second oil tight chamber 76 as a medium for transferring power.

The piezo piston 78 is equipped at its inside with a check valve 80 via which the second oil tight chamber 76. The check valve 80 enables fuel to be supplied from the low-pressure fuel passage 9a into the second oil tight chamber 76, and disables fuel to be reversed from the second oil tight chamber 76 into the low-pressure passage 9a.

The piezo injector PI1A is provided with a piezo element PE having one end and the other end along the axial direction of the body 60 and contained in the containing chamber 79. The one end of the piezo element PE is fixed to the piezo piston 78, and the other end thereof is fixed to the other end of the body 60. The piezo element PE has a substantially identical stack configuration of the piezo element according to the first embodiment.

Specifically, when energized, the piezo element PE longitudinally expands from its original total length. The expansion of the piezo element PE causes the piezo piston 78 to move toward the one distal end (nozzle-side end) of the body 60. The movement of the piezo piston 78 allows the pressure of the fuel contained in each of the second oil tight chamber 76, the communication passage 74, and the first oil tight chamber 72 to increase.

At that time, the valve assembly (the needle valve 62) is biased toward the piezo-element side end of the body 60 by the force caused by the high-pressurized fuel contained in the needle chamber 65. In addition, the valve assembly (the needle piston 66) is biased by the pressure of the fuel contained in the first oil tight chamber 72 toward the piezo-element side end of the body 60. The biasing force caused by the high-pressurized fuel contained in the needle chamber 65 and by the pressure of the fuel contained in the first oil tight chamber 72 will be referred to as "valve opening force" hereinafter.

In contrast, the needle piston 66 is biased by the spring 70 and the low-pressurized fuel contained in the back pressure chamber 71 toward the nozzle side end of the body 60. In addition, the balance piston 68 is biased by the high-pressurized fuel contained in the balance chamber 69 toward the nozzle side end of the body 60. The biasing force caused by the spring 70, the low-pressurized fuel contained in the back pressure chamber 71, and the high-pressurized fuel contained in the balance chamber 69 will be referred to as "valve closing force" hereinafter.

When the valve opening force exceeds the valve closing force as the pressure of the fuel contained in each of the second oil tight chamber 76, the communication passage 74, and the first oil tight chamber 72 increases, the valve assembly (needle valve 62) is moved toward the piezo-element side end of the body 60 from the valve seat 64. This allows the fuel injector PI1A to be opened.

On the other hand, when discharged, the total length of the piezo element PE decreases toward its original total length. The reduction of the piezo element PE in its total length causes the piezo piston 78 to move toward the piezo-element side end) of the body 60. The movement of the piezo piston 78 allows the pressure of the fuel contained in each of the second oil tight chamber 76, the communication passage 74, and the first oil tight chamber 72 to decrease.

When the valve closing force exceeds the valve opening force as the pressure of the fuel contained in each of the second oil tight chamber 76, the communication passage 74, and the first oil tight chamber 72 decreases, the valve assembly (needle valve 62) is moved toward the valve seat 64. This results in that the needle valve 62 is seated on the valve seat 64, allowing the fuel injector PI1A to be closed.

Specifically, in the structure of the piezo injector PI1A, the displacement of the needle valve 62 from the valve seat 64, which corresponds to the lift amount of the needle valve 62, changes depending on the change in the total length of the piezo element PE. This allows the lift amount of the needle valve 62 to be freely adjusted within the range between its zero-lift position and its full lift stroke; this zero-lift position corresponds to the piezo injector PI1A being closed.

Figure 10:
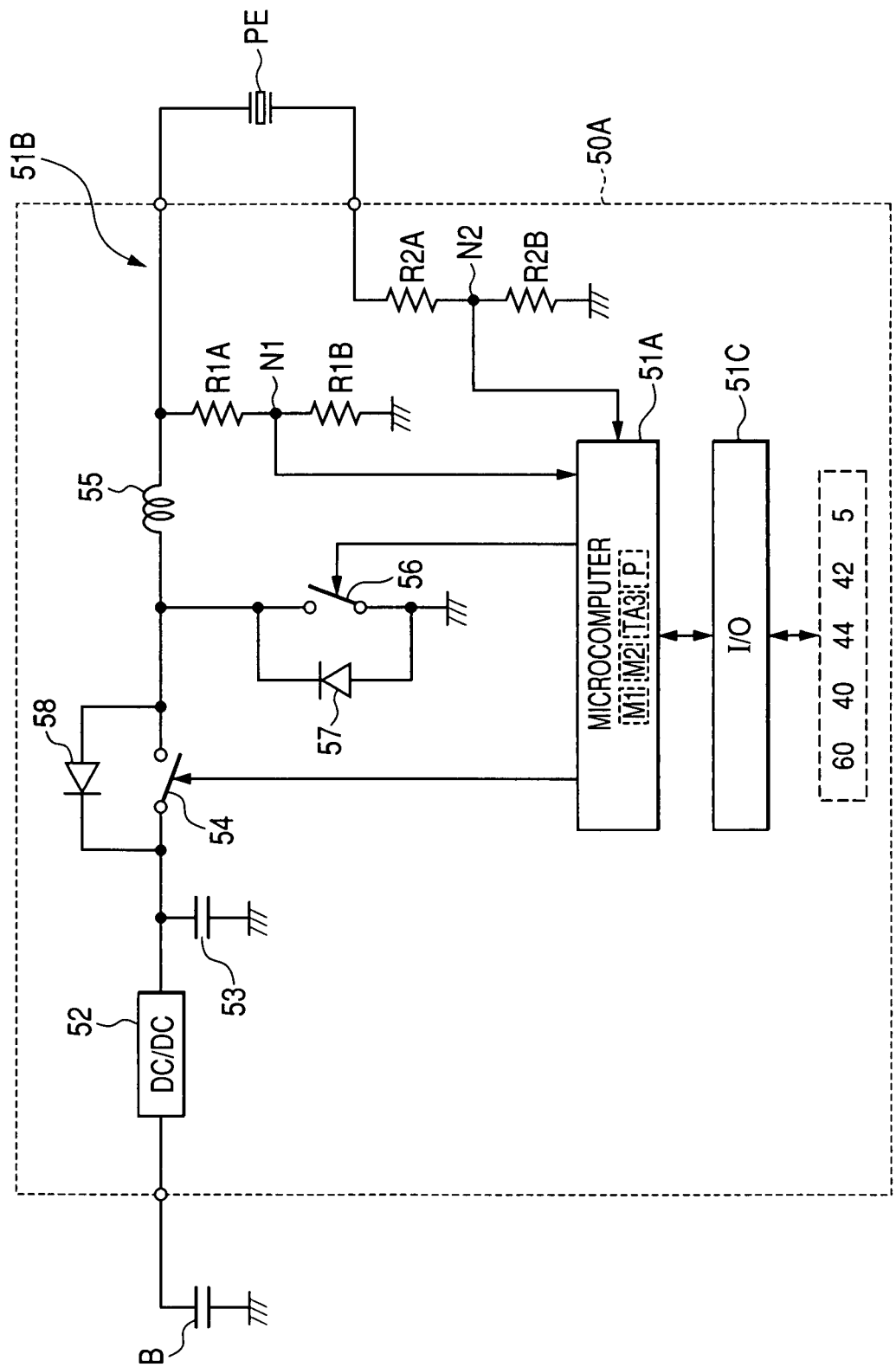
FIG. 10 is a circuit diagram schematically illustrating an example of the circuit structure of an ECU according to the second embodiment.

Referring to FIG. 10, the fuel injection control system is equipped with an ECU 50A including a microcomputer 51A, a driver 51B connected to the piezo element PE of each of the piezo injectors PI1A to PINA, and an I/O interface 51C electrically connected to the microcomputer 51, the sensors 40, 42, and 44, and the metering valve 5.

The driver 51B is provided with a DC to DC converter 52 as an example of step-up converters, a capacitor 53, a charging switch 54, a charging and discharging coil 55, a discharging switch 56, diodes 57 and 58, and resistors R1A, R1B, R2A, and R2B.

The vehicle is equipped with a battery B whose positive electrode is electrically connected to the DC to DC converter 52. An output voltage, such as 12 V, as electric power fed from the battery B is supplied to the DC to DC converter 52. The output voltage (battery voltage) from the battery B is boosted by the DC to DC converter 52 to a high voltage of, for example, 200 to 300 V, required to charge the piezo element PE.

One high-side electrode of the capacitor 53 is electrically connected to the DC to DC converter 52, and the other low-side electrode thereof is grounded.

Specifically, the stepped-up voltage output from the DC to DC converter 52 is applied to the one electrode of the capacitor 53 so that the stepped-up voltage is charged by the capacitor 53.

One high-side electrode of the piezo element PE is electrically connected to the high-side electrode of the capacitor 53 through the charging switch 54 and the charging and discharging coil 55, which are electrically connected in series. The low-side electrode of the piezo element PE is grounded.

An intermediate point between the charging switch 54 and the charging and discharging coil 55 is electrically connected to one terminal of the discharging switch 56, and the other terminal is grounded.

The diode 57 is electrically connected between one and the other terminals of the discharging switch 56 in parallel thereto such that its forward direction is directed from the ground side of the discharging switch 56 toward the capacitor 53 and the charging and discharging coil 55. The diode 57, the capacitor 53, the charging and discharging coil 55, and the discharging coil 56 serve as a first chopper circuit CC1 working to charge the piezo element PE. In the first chopper circuit CC1, the diode 57 serves as a first flywheel diode.

The diode 58 is electrically connected between one and the other terminals of the charging switch 54 in parallel thereto such that its forward direction is directed from the discharging switch side toward the capacitor side. The diode 58, the capacitor 53, the charging and discharging coil 55, and the discharging coil 56 serve as a second chopper circuit working to discharge the piezo element PE. In the second chopper circuit, the diode 58 serves as a flywheel diode.

One end of a series-connected resistors R1A and R1B is connected to the connecting line between the high-side electrode of the piezo element PE and the charging and discharging coil 55, and the other end is grounded.

One end of a series-connected resistors R2A and R2B is connected to the low-side electrode of the piezo element PE, and the other end is grounded.

The driver 51B having the circuit structure set forth above is driven by the microcomputer 51A.

The I/O interface 51C is operative to:

receive pieces of data output from the sensors 40, 42, and 44;

convert the received pieces of data to be recognizable by the microcomputer 51A as need arises; and send a predetermined control command to the metering valve 5.

The microcomputer 51A is electrically connected to a connecting point N1 between the resistors R1A and R1B and to a connecting point N2 between the resistors R2A and R2B.

Specifically, the microcomputer 51A consists of a CPU and a storage unit replaceably or permanently integrated with at least one of various types of storage media, such as a volatile/nonvolatile storage medium.

The storage unit has stored therein the maps M1 and M2 and programs P that cause the ECU 50A to execute various tasks including a fuel injection control task for control of the output of the diesel engine 1.

Specifically, in accordance with at least one program P, the ECU 50A controls the opening and closing of each of the individual switches 54 and 56 using the maps M1 and M2, the received pieces of data supplied from the sensors 40, 42, and 44, a voltage of the piezo element PE via the connecting point N1, and a current flowing through the piezo element PE via the connecting point N2. In the second embodiment, the opening and closing control of each of the individual switches 54 and 56 is carried out by the microcomputer 50A based on a timing chart illustrated in FIG. 11.

Figure 11:
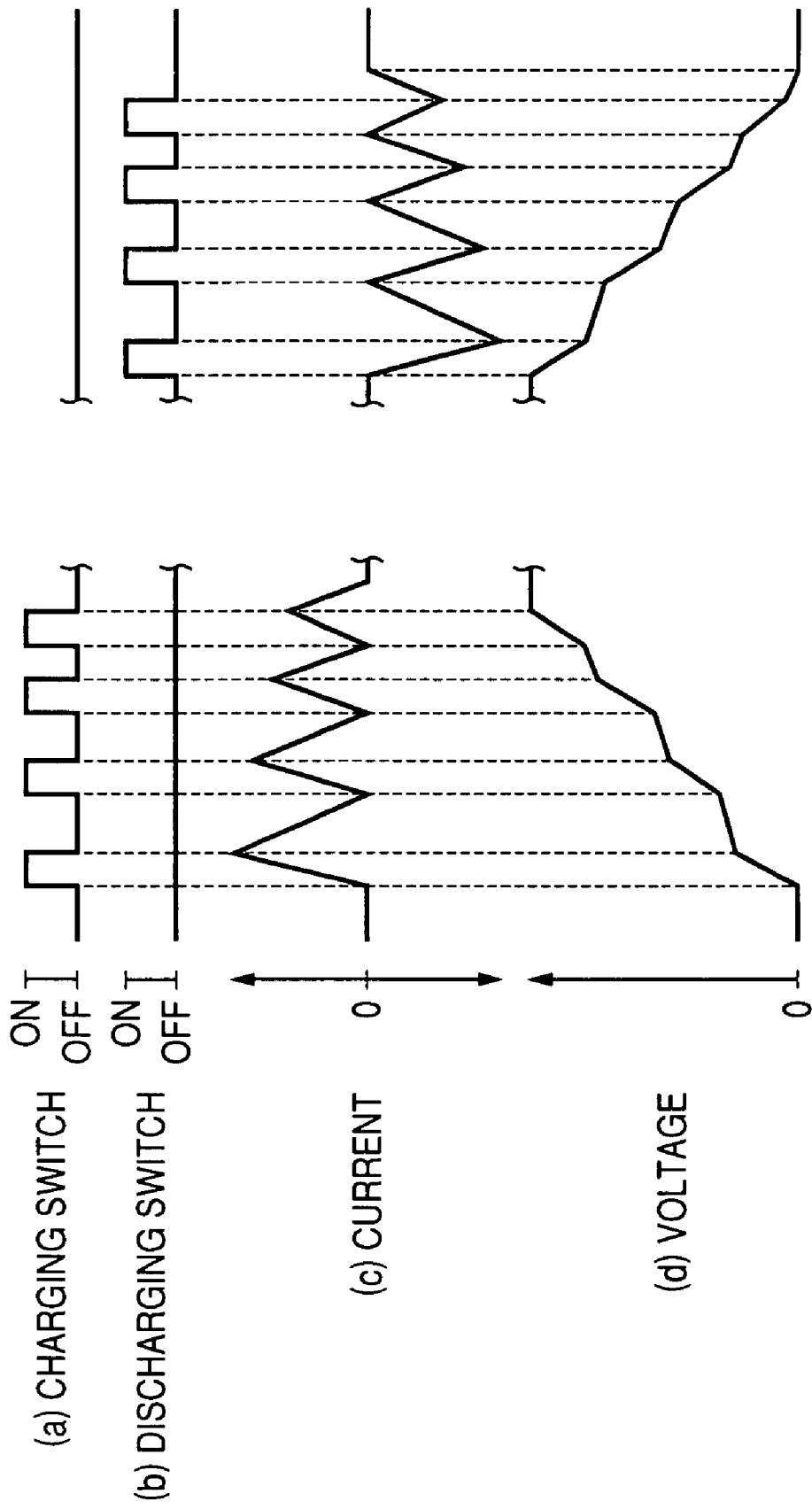
FIG. 11 is a timing chart schematically illustrating: on and off timings of a charging switch illustrated in FIG. 10, on and off timings of a charging and discharging switch illustrated in FIG. 10; a waveform of a current flowing through a piezo element illustrated in FIG. 10; and a waveform of a voltage applied on the piezo element.

(a) of FIG. 11 schematically illustrates on and off timings of the charging switch 54, and (b) of FIG. 11 schematically illustrates on and off timings of the charging and discharging switch 56.

(c) of FIG. 11 schematically illustrates a waveform of the current flowing through the piezo element PE.

(d) of FIG. 11 schematically illustrates a waveform of the voltage of the piezo element PE.

As illustrated in FIG. 11, chopper control by on and off operations of the charging switch 54 allows the current to be charged in the piezo element PE while it alternately increases and decreases.

Specifically, turning on of the charging switch 54 allows a closed loop circuit consisting of the capacitor 53, the charging switch 54, the charging and discharging coil 55, and the piezo element PE to be created.

This permits the electrical charge stored in the capacitor 53 to be charged in the piezo element PE, increasing the amount of current flowing through the piezo element PE.

When the charging switch 54 is turned off from its on state, a closed loop circuit consisting of the charging and discharging coil 55, the piezo element PE, the flywheel diode 57 is created. This allows the flywheel energy stored in the charging and discharging coil 55 to be discharged and supplied to the piezo element PE via the flywheel diode 57, reducing the amount of current flowing through the piezo element PE.

The step-down chopper control by on and off operations of the charging switch 54 permits the piezo element PE to be charged so that the potential of the high-side electrode of the piezo element PE to increase.

In addition, chopper control by on and off operations of the discharging switch 56 allows the current to be discharged from the piezo element PE while it alternately increases and decreases.

Specifically, turning on of the discharging switch 56 allows a closed loop circuit consisting of the discharging switch 56, the charging and discharging coil 55, and the piezo element PE to be created.

This permits the electrical charge stored in the piezo element PE to be discharged therefrom to be supplied to the charging and discharging coil 55, reducing the amount of current flowing through the piezo element PE.

When the discharging switch 56 is turned off from its on state, a closed loop circuit consisting of the capacitor 53, the flywheel diode 58, the charging and discharging coil 55, and the piezo element PE is created. This allows the flywheel energy stored in the charging and discharging coil 55 to be further charged in the capacitor 53, increasing the amount of current flowing through the piezo element PE.

The step-up chopper control by on and off operations of the discharging switch 56 permits the piezo element PE to discharge therefrom so that the potential of the high-side electrode of the piezo element PE to decrease.

In the second embodiment, each of the switches 54 and 56 is controlled such that it is in on state during a predetermined constant duration and it is turned from on state to off state when no current flows through the piezo element PE. That is, constant on-duration control is carried out for each of the switches 54 and 56.

The constant on-duration control for each of the switches 54 and 56 can substantially make constant the rate of change in energy stored in the piezo element PE.

For this reason, charge of the piezo element PE using the constant on-duration control can control the amount of energy to be supplied to the piezo element PE by adjusting the charging time for the piezo element PE.

Note that, under the constant amount of energy being applied to the piezo element PE, the increase in the total length of the piezo element PE is substantially constant independently of the temperature therein. For this reason, the constant on-duration control allows the lift amount of the needle valve 62 to be simply controlled.

In contrast, when the charging of the piezo element PE is carried out based on merely a voltage to be supplied thereto, the increase in the total length of the piezo element PE may be changed depending on the temperature therein. For this reason, in order to control the lift amount of the needle valve 62 with high accuracy, it may be necessary to correct a target voltage to be supplied to the piezo element PE based on the temperature therein.

Note that the constant on-duration control for each of the switches 54 and 56 that can substantially make constant the increase in the total length of the piezo element PE has been described in, for example, Japanese Unexamined Patent Publication No. 2005-130561. Note that the chopper control for on and off operations of the switches 54 and 56 described in the second embodiment, which can make constant the energy to be supplied to the piezo element PE, has been described in, for example, Japanese Unexamined Patent Publication No. 2002-136156.

Specifically, as described in the Patent Publication No. 2005-130561, the energy E being applied to the piezo element PE based on the constant on-duration control for each of the switches 54 and 56 can be expressed by the following equation:

$$E = C \times V^2 \times \tfrac{1}{2}$$

Where E represents the applied energy, C represents a capacitance of the piezo element PE, and V represents a voltage applied to both sides of the piezo element PE.

The increase in the total length of the piezo element PE is proportional to the product of a piezoelectric modulus d33 and the voltage V, and therefore, the increase INC in the total length of the piezo element PE is represented by the following equation:

$$INC = d33 \times (2 \times E/C)^{1/2}$$

Specifically, the increase INC in the total length of the piezo element PE is proportional to the "$d33/C^{1/2}$" upon the applied energy E being constant.

Thus, when the rate of change in the piezoelectric modulus d33 with respect to temperature variations is represented by "a" and the rate of change in the capacitance C with respect to temperature variations is represented by TC, the establishment of the following equation allows the increase in the total length of the piezo element PE to be substantially constant independently of the temperature therein:

$$a = k(TC)^{1/2}$$

Where k is a constant.

Specifically, the constant energy E being applied to the piezo element PE that is made of a piezoelectric material meeting the equation of "$a = k(TC)^{1/2}$" allows the increase in the total length of the piezo element PE to be substantially constant independently of temperature variations therein.

In addition, during the piezo element PE being charged, the current to be charged in the piezo element PE gradually reduced over time while changing in a chopper waveform whereas the voltage of the piezo element PE gradually increases (see FIG. 11).

In contrast, during the piezo element PE being discharged, the current to be discharged from the piezo element PE gradually increases over time while changing in a chopper waveform whereas the voltage of the piezo element PE gradually decreases (see FIG. 11).

As described in the Patent Publication No. 2002-136156, even if the capacitance of the piezo element PE slightly increases during the piezo element PE being charged, the increasing rate of the voltage of the piezo element PE is slightly reduced and the decreasing rate of the current to be charged in the piezo element PE is also slightly reduced.

The reduction of the increasing rate of the voltage of the piezo element PE is active in the reduction of the amount of energy to be supplied to the piezo element PE per unit of time.

The increase of the decreasing rate of the current to be charged in the piezo element PE is active in the increase of the amount of energy to be supplied to the piezo element PE. The reduction of the amount of energy to be supplied to the piezo element PE per unit of time can be offset with the increase of the decreasing rate of the current to be charged in the piezo element PE.

Accordingly, it is possible to make constant the energy to be supplied to the piezo element PE per unit of time.

As described above, the amount of energy to be supplied to the piezo element PE permits the displacement therein in the longitudinal direction of the body 60 to be adjusted. This makes it possible to freely control the lift amount of the needle valve 62 within the range between its zero-lift position and its full lift stroke at which the balance piston 68 is contacted on the stopper 67.

In the second embodiment, however, as described in the first embodiment, direct contact between the needle valve 62 and the needle seat 64 may cause the wearing out of at least one of the needle valve 62 and the needle seat 64.

Similarly, direct contact between the balance piston 68 and the stopper 67 may also cause the wearing out of at least one of the balance piston 68 and the stopper 67.

Thus, in the second embodiment like the first embodiment, the microcomputer 51A is programmed to execute processes in steps S8 to S14 illustrated in FIG. 7 in accordance with at least one program stored in the storage unit for executing the minimum interval detecting task and the learning task.

In step S16a, the microcomputer 51A individually controls the on and off operations of the charging and discharging switches 54 and 56 such that each of the switches 54 and 56 is in on state for a predetermined constant on-duration. This makes it possible to supply a constant amount of energy to the piezo element PE of the piezo injector PIiA, thus carrying out fuel injections every command injection period Ti.

In addition, in step S16a, the microcomputer 51A computes, based on the measured data of the crank angle sensor 42, a current sampling value $\Delta NEi(n)$ of the rotation speed of the crankshaft 3 that rotates as the cylinder #i is combusted when the corresponding piezo injector PIiA caries out fuel injections every injection period Ti.

Subsequently, the processes S18 to S24 illustrated in FIG. 7 are carried out.

As a result, the amount $\Delta Lf$ of change in the full lift stroke Lf of the piezo injector PIiA can be computed in accordance with the equation [1] set forth above based on the corrected command injection period Ti and the pressure NPC of the fuel accumulated in the common rail 6.

Thereafter, in step S26a illustrated in FIG. 12A, the microcomputer 51A corrects the increase in the total length of the piezo element PE during the operating conditions of the diesel engine 1 being contained in the full lift injection region R1 based on the amount $\Delta Lf$ of change in the full lift stroke Lf of the piezo injector PIiA.

Specifically, in step S26a, as illustrated in FIG. 12B, the microcomputer 51A provides a table TA3 whose recodes are associated with a variable of the pressure of the fuel accumulated in the common rail 6; this variable is contained in the full-lift injection region R1.

Next, in step S26a, the microcomputer 51A computes corrected amounts of energy to be supplied to the piezo element PE based on the computed amount $\Delta Lf$ of change in the full lift stroke Lf of the piezo injector PIiA and each of the values of pressure of the fuel accumulated in the common rail 6, thus storing the computed corrected amounts of energy into the corresponding recodes of the table TA3, respectively.

As described above, the fuel injection control system according to the second embodiment is configured to directly correct the increase in the total length of the piezo element PE required to move the needle valve 62 at the full lift stroke in each of the piezo injectors PI1A to PINA based on the computed amount $\Delta Lf$ of change in the full lift stroke Lf of a corresponding one of the piezo injectors PI1A to PINA.

Thus, the fuel injection control system can obtain the eighth effect in addition to the first to seventh effects as follows:

Specifically, as the eighth effect, it is possible to directly correct the increase in the total length of the piezo element PE with a command fuel period kept constant. The direct correction of the longitudinal expansion of the piezo element PE can correct not only the rate of fuel to be injected by each of the piezo injectors PI1A to PINA per unit of time but also the variations in the fuel quantity due to a scalar variation of a corresponding one of the piezo injectors PI1A and PINA.

Third Embodiment

A fuel injection control system according to a third embodiment of the present invention will be described hereinafter with emphasis on the difference points from the structure and operations of the fuel injection control system according to the first or second embodiment.

Figure 13:
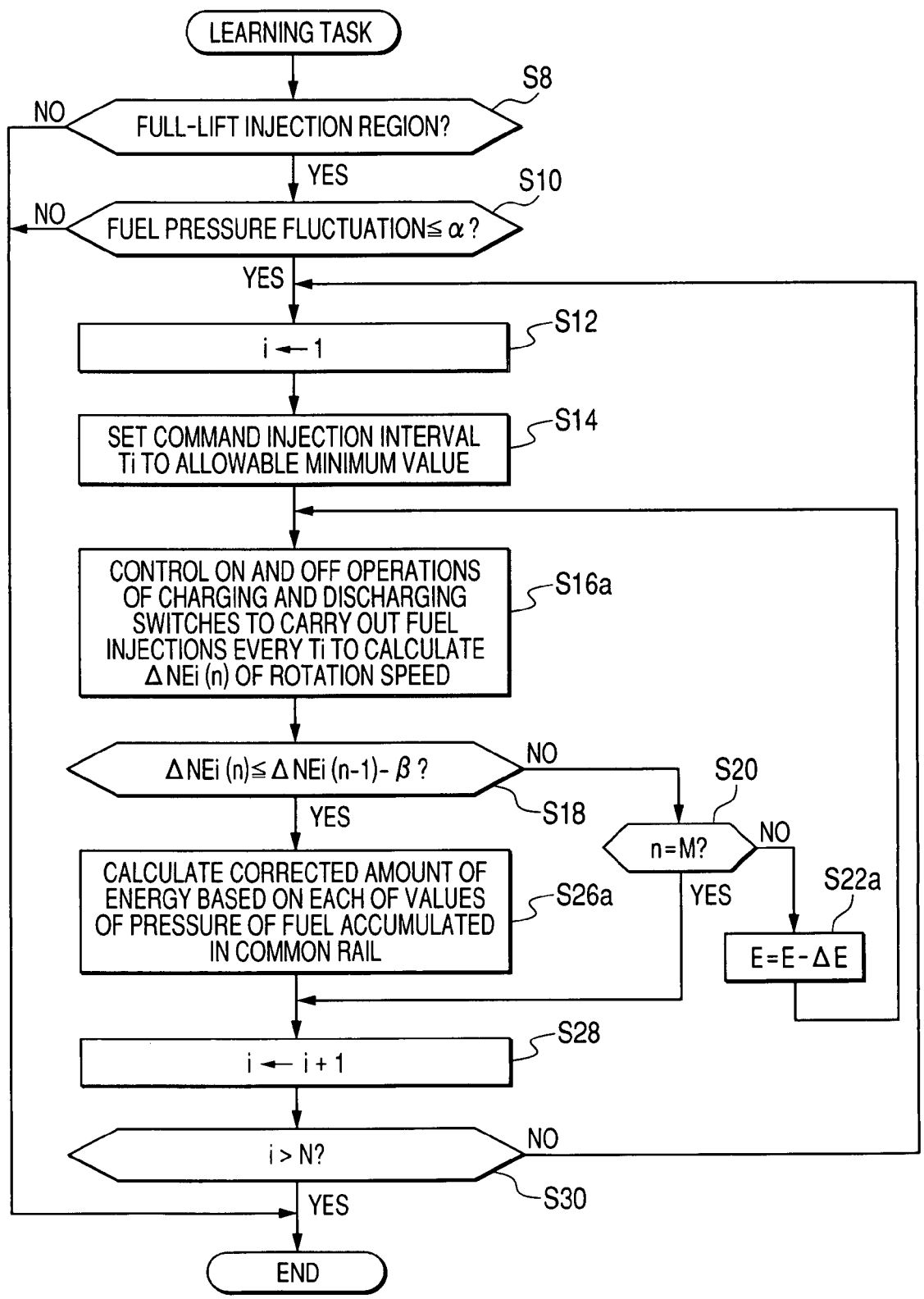
FIG. 13 a flowchart schematically illustrating processes to be executable by a microcomputer for executing a minimum interval detecting task and a learning task according to a third embodiment of the present invention.

FIG. 13 schematically illustrates processes to be executable by the microcomputer 51A in accordance with at least one program stored in the storage unit for executing the minimum interval detecting task and the learning task according to the third embodiment. Note that like reference characters are assigned to like steps in FIGS. 7 and 13, and therefore, descriptions of the like steps will be therefore omitted. Like the first embodiment, the sequence of the processes is repeatedly executed by the microcomputer 51A every cycle of, for example, 5,000 km of driving.

Specifically, the processes in steps S8 to S14 illustrated in FIG. 13, which are substantially identical to those in corresponding steps in FIG. 7, are carried out.

In step S16a, the microcomputer 51A individually controls the on and off operations of the charging and discharging switches 54 and 56 such that each of the switches 54 and 56 is in on state for a predetermined constant on-duration. This makes it possible to supply a constant amount of energy to the piezo element PE of the piezo injector PIiA, thus carrying out fuel injections every command injection period Ti.

In addition, in step S16a, the microcomputer 51A computes, based on the measured data of the crank angle sensor 42, a current sampling value $\Delta NEi(n)$ of the rotation speed of the crankshaft 3 that rotates as the cylinder #i is combusted when the corresponding piezo injector PIiA caries out fuel injections every injection period Ti.

Subsequently, the processes S18 and S20 illustrated in FIG. 13, which are substantially identical to those in corresponding steps in FIG. 7, are carried out.

Specifically, when it is determined that the sampling number n does not reach the predetermined number M (the determination in step S20 is NO), the microcomputer 51A proceeds to strep S22a.

In step S22a, the microcomputer 51A corrects the amount E of energy to be supplied to the piezo injector PIiA by, for example, decreasing the amount E of energy by $\Delta E$, returning to step S16a and repeating the processes in steps S16a to S22 until the determination in the process in step S18 or S20 is affirmative.

The processes in steps S16a to S22a are to determine a corrected amount of longitudinal expansion of the piezo element PE so as to reduce the lift amount of needle valve 62.

Specifically, when it is determined that the current sampling value ΔNEi(n) is equal to or lower than the value obtained by subtracting the predetermined value β from the previous sampling value ΔNEi(n−1), the determination in step S18 is affirmative. Then, the microcomputer 51A determines that the corrected amount of longitudinal expansion of the piezo element PE allows actual adjacent injection periods to be non-overlapped with each other. Then, the microcomputer 51A proceeds to step S24a.

Because the corrected amount of longitudinal expansion of the piezo element PE allows actual adjacent injection periods to be non-overlapped with each other, the microcomputer 51A determines that the amount ΔLf of change in the full lift stroke Lf of the piezo injector PIiA can be compensated by the current corrected amount of energy to be supplied to the piezo element PE corresponding to the corrected amount of longitudinal expansion of the piezo element PE.

Thus, in step S24a, the microcomputer 51A corrects, as the amount of energy equivalent to the full lift stroke of the piezo element PE, the current corrected amount E of energy to be supplied to the piezo element PE based on each of the values of the pressure of the fuel accumulated in the common rail 6. Then, the microcomputer 51A stores the computed corrected amounts of energy into recodes of a table, like the table TA3, which are associated with the respective vales of the pressure of the fuel accumulated in the common rail 6.

As described above, the configuration of the fuel injection control system can obtain the first to eighth effects as well as that of the system according to the second embodiment.

In the first embodiment, the amount of correction of the injection characteristics over the whole of the full-lift injection region R1 is computed based on the learned amount ΔLf of change in the full lift stroke Lf of each of the piezo injectors PI1 to PIN and each of the values of the pressure of the fuel accumulated in the common rail 6. However, the present invention is not limited to the structure.

Specifically, the full-lift injection region R1 can be divided into a plurality of zones, and the processes in step S8 to S24 of FIG. 7 for computing learned amount ΔLf of change in the full lift stroke Lf can be executed in each of the divided zones.

In the first and second embodiments, when actual adjacent injection periods are overlapped with each other, gradual increase in a corresponding command injection interval detects a minimum command interval in which the actual adjacent injection periods to be shifted from being overlapped with each other into being non-overlapped with each other. However, the present invention is not limited to the structure.

Specifically, when actual adjacent injection periods are non-overlapped with each other, gradual reduction in a corresponding command injection interval can detect a minimum command interval in which the actual adjacent injection periods to be shifted from being non-overlapped with each other into being overlapped with each other.

In the second and third embodiments, the amount of longitudinal expansion of the piezo element PE is grasped based on the amount of energy to be supplied thereto, but the present invention is not limited to the structure.

Specifically, the amount of longitudinal expansion of the piezo element PE can be grasped based on the voltage thereof. In this case, it is preferable to grasp the amount of longitudinal expansion of the piezo element PE depending on the temperature therein.

It is essential to grasp the longitudinal displacement of the piezo element PE based on the quantity of electrical state of the piezo element PE in relation to the longitudinal displacement thereof.

In the first to third embodiments, cylinder-to-cylinder learning is carried out, but the present invention is not limited to the method.

Specifically, in four cylinder internal combustion engines, when fuel injection is carried out in the order of the first cylinder, the fourth cylinder, the third cylinder, and the second cylinder, it is possible to simultaneously learn the amount of deviation from the fuel injection characteristics of the piezo injectors corresponding to the first and third cylinders. In this case, change in a command injection period for each of the first and third cylinders in the four-stroke cycle allows the simultaneous learning to be implemented.

As methods of learning the amount of deviation from the fuel injection characteristics of a piezo injector, the method of calculating the amount ΔLf of change in the full lift stroke Lf of the piezo injector can be used, but the present invention is not limited to the method.

Specifically, it is possible to calculate corrected command injection periods based on a map, a corrected command injection interval Ti at the affirmative determination in step S18, and a current value of the pressure of the fuel accommodated in the common rail 6. The map represents a relationship between a variable of the command injection interval, a variable of the corrected command injection periods, and that of the pressure of the fuel accommodated in the common rail 6.

The structure of each of the piezo injectors PI1 (PI1A) to PIN (PINA) is not limited to the structure illustrated in FIG. 2 or FIG. 9. For example, each of the piezo injectors PI1 (PI1A) to PIN (PINA) can be provided with means for changing a position of the needle stopper 21 and/or the stopper 67 in the longitudinal direction of the body. In this modification, adjustment of the needle stopper 21 and/or the stopper 67 in the longitudinal direction of the body depending on the amount ΔLf of change in the full lift stroke Lf permits aged variations in the injection characteristics of each of the piezo injectors PI1 (PI1A) to PIN (PINA) to be effectively compensated.

In the first to third embodiments, as fuel injectors, piezo injectors each composed of a piezo element (piezo actuator) are used, but the present invention is not limited to the usage.

Specifically, as fuel injectors, solenoid injectors each composed of an electromagnetic solenoid can be used.

While there has been described what is at present considered to be the embodiment and modifications of the present invention, it will be understood that various modifications which are not described yet may be made therein, and it is intended to cover in the appended claims all such modifications as fall within the true spirit and scope of the invention.

What is claimed is:

1. An apparatus for learning a deviation from a reference injection characteristic of a fuel injector and provided for a cylinder of an internal combustion engine having an output shaft, the fuel injector including a valve and an actuator operatively connected thereto, the actuator being displacable in a predetermined direction, power being generated in the cylinder based on the fuel injected from the fuel injector thereinto and being transferred to the output shaft via a mechanism so as to rotate the output shaft, the apparatus comprising:

an injection executing unit configured to cause the actuator to displace in the predetermined direction so that the valve moves between an original position and a predetermined full stroke in the predetermined direction to thereby execute a plurality of fuel injections into the cylinder for a plurality of injection periods, respectively, each interval between temporally adjacent fuel injection periods in the plurality of injection periods being set to a reference minimum value; and a learning unit operatively connected to the actuator and configured to determine whether the temporally adjacent fuel injection periods are non-overlapped with each other while correcting an amount of the displacement of the actuator so as to move the valve at the predetermined full stroke in the predetermined direction, the learning unit being configured to learn, as the deviation from the reference injection characteristic of the fuel injector, the corrected amount of the displacement of the actuator at a time when the temporally adjacent fuel injection periods are non-overlapped with each other.

2. An apparatus for learning a deviation from a reference injection characteristic of a fuel injector provided for a cylinder of an engine having an output shaft, power being generated in the cylinder based on fuel injected from the fuel injector thereinto and being transferred to the output shaft via a mechanism so as to rotate the output shaft, the apparatus comprising:

an injection executing unit configured to cause the fuel injector to execute a plurality of fuel injections into the cylinder for a plurality of injection periods, respectively;

a detecting unit configured to detect a minimum interval between temporally adjacent fuel injection periods in the plurality of fuel injection periods based on a behavior of the output shaft during execution of the plurality of fuel injections, the minimum interval maintaining the temporally adjacent fuel injection periods to be non-overlapped with each other; and a learning unit configured to learn the deviation from the reference injection characteristic of the fuel injector based on the detected minimum interval.

3. An apparatus according to claim 2, wherein the learning unit is operatively connected to the injection executing unit and configured to:

control the injection executing unit to change an interval between the temporally adjacent fuel injection periods in the plurality of injection periods;

determine whether a change in rotation of the output shaft during execution of the plurality of fuel injections is equal to or greater than a predetermined amount of rotation; and obtain the minimum interval between the temporally adjacent fuel injection periods based on the changed interval at a time when it is determined the change in rotation of the output shaft during execution of the plurality of fuel injections is equal to or greater than the predetermined amount of rotation.

4. An apparatus according to claim 2, wherein the internal combustion engine includes a plurality of the cylinders, and the learning unit is operatively connected to the injection executing unit and configured to:

control the injection executing unit to change an interval between the temporally adjacent fuel injection periods in the plurality of injection periods for the respective fuel injections into one of the cylinders;

determine whether a change in rotation of the output shaft during execution of the plurality of fuel injections into the one of the cylinders is equal to or greater than a predetermined amount of rotation; and obtain the minimum interval between the temporally adjacent fuel injection periods based on the changed interval at a time when it is determined the change in rotation of the output shaft during execution of the plurality of fuel injections is equal to or greater than the predetermined amount of rotation.

5. An apparatus according to claim 2, wherein the internal combustion engine includes a common rail for accumulating high-pressurized fuel and for supplying the high-pressurized fuel into the fuel injector as the fuel to be injected therefrom into the cylinder, and the learning unit is configured to:

measure fluctuations in the high-pressurized fuel in the common rail;

determine whether the measured fluctuations are kept equal to or greater than a predetermined threshold; and start to the learning of the deviation from the reference injection characteristic when it is determined that the measured fluctuations are kept equal to or greater than the predetermined threshold.

6. An apparatus according to claim 2, wherein the fuel injector includes a valve and an actuator operatively connected thereto, the actuator being displacable in a predetermined direction, and the injection executing unit is configured to cause the actuator to displace in the predetermined direction so that the valve moves between an original position and a predetermined full stroke in the predetermined direction, movement of the valve in the predetermined direction allowing the fuel injector to execute the plurality of fuel injections into the cylinder, and wherein the leaning unit is configured to learn the deviation from the reference injection characteristic of the fuel injector based on the detected minimum interval when the injection executing unit is configured to cause the actuator to displace in the predetermined direction so that the valve moves up to the predetermined full stroke in the predetermined direction.

7. An apparatus according to claim 2, wherein the fuel injector comprises:

a housing having a predetermined length and an internal cavity defined by a wall, the housing being formed at one end in a length direction thereof with a nozzle, the nozzle being communicated with the inner hollow portion, the wall being formed with a valve seat surrounding the nozzle;

a valve installed in the inner hollow portion and seatable upon the valve seat; and an actuator operatively coupled to the valve and controllably coupled to the learning unit, the actuator being driven to allow the valve to be moved from the valve seat at a full stroke so as to inject the fuel contained in the internal cavity via the nozzle into the cylinder, the actuator being driven to allow the valve to be moved toward the valve seat so as to be seated on the valve seat, thus interrupting the injection of the fuel, and the learning unit includes a calculating unit configured to calculate a deviation of the full stroke of the valve from a predetermined reference full stroke based on the detected minimum interval.

8. An apparatus according to claim 7, wherein the learning unit is operatively connected to the injection executing unit and configured to:

control the injection executing unit based on a plurality of command injection periods to cause the fuel injector to execute a plurality of fuel injections into the cylinder for a plurality of injection periods corresponding to the plurality of command injection periods, respectively, and the learning unit includes a correcting unit configured to correct, based on the deviation of the full stroke of the valve from the predetermined reference full stroke, at least one of:

an allowable minimum value between the temporally adjacent fuel injection periods in the plurality of fuel injection periods based on the detected minimum interval, the allowable minimum value being previously determined based on an actual minimum interval between the temporally adjacent fuel injection periods that are not overlapped from each other; and a temporally adjacent command injection periods in the plurality of command injection periods, these temporally adjacent command injection periods corresponding to the temporally adjacent fuel injection periods.

9. An apparatus according to claim 8, wherein the fuel having a pressure is supplied to the fuel injector, and the learning unit is configured to correct the temporally adjacent command injection periods in the plurality of command injection periods based on the deviation of the full stroke of the valve from the predetermined reference full stroke and the pressure of the fuel to be supplied to the fuel injector.

* * * * *